US012801471B2

(12) United States Patent
Ayachitula et al.

(10) Patent No.: US 12,801,471 B2
(45) Date of Patent: Nov. 17, 2026

(54) EXPLAINABLE CLASSIFICATIONS WITH ABSTENTION USING CLIENT AGNOSTIC MACHINE LEARNING MODELS

(71) Applicant: Kyndryl, Inc., New York, NY (US)

(72) Inventors: Arun A. Ayachitula, Dobbs Ferry, NY (US); Rohit Khandekar, Jersey City, NJ (US); Upendra Sharma, Hartsdale, NY (US)

(73) Assignee: Kyndryl, Inc., New York, NY (US)

( * ) Notice: Subject to any disclaimer, the term of this patent is extended or adjusted under 35 U.S.C. 154(b) by 719 days.

(21) Appl. No.: 18/300,688

(22) Filed: Apr. 14, 2023

(65) Prior Publication Data

US 2024/0345905 A1 Oct. 17, 2024

(51) Int. Cl.
*G06F 11/07* (2006.01)
*G06F 40/40* (2020.01)

(52) U.S. Cl.
CPC .......... *G06F 11/0769* (2013.01); *G06F 40/40* (2020.01)

(58) Field of Classification Search
CPC ............... G06F 11/0769; G06F 11/004; G06F 11/0793; G06F 11/00; G06F 40/40; G06F 11/769; G05B 23/024; G06N 20/20; G06N 3/04; G06N 3/09; G06N 20/00; G06N 3/044; G06N 3/045; G06N 3/08; G06N 3/084; G06N 5/01; G06N 5/022; G06N 5/025; G06N 5/045; G06N 7/01; G06N 20/10
See application file for complete search history.

(56) References Cited

U.S. PATENT DOCUMENTS

| | | | | |
|---|---|---|---|---|
| 10,438,212 | B1 * | 10/2019 | Jilani | G06N 5/025 |
| 10,621,550 | B2 * | 4/2020 | Carey | G16H 10/40 |
| 10,740,692 | B2 * | 8/2020 | Mann | G06F 11/008 |
| 10,824,959 | B1 * | 11/2020 | Chatterjee | G06N 5/025 |
| 11,270,226 | B2 | 3/2022 | Meng et al. | |

(Continued)

FOREIGN PATENT DOCUMENTS

| | | | | |
|---|---|---|---|---|
| EP | 3447696 A1 | | 2/2019 | |
| GB | 2603279 A | * | 8/2022 | G06N 3/047 |

(Continued)

OTHER PUBLICATIONS

R. Chatterjee, A. Ahmed, P. Rose Anish, B. Suman, P. Lawhatre and S. Ghaisas, "A Pipeline for Automating Labeling to Prediction in Classification of NFRs," 2021 IEEE 29th International Requirements Engineering Conference (RE), Notre Dame, IN, USA, 2021, pp. 323-323.*

(Continued)

*Primary Examiner* — Pierre Michel Bataille
(74) *Attorney, Agent, or Firm* — CANTOR COLBURN LLP; John Kennel

(57) ABSTRACT

Embodiments relate to providing explainable classifications with abstention using client agnostic machine learning models. A technique includes inputting, by a processor, records to a machine learning model, the records being associated with an information technology (IT) domain. The technique includes classifying, by the processor, the records with labels using the machine learning model, the machine learning model abstaining from classifying a given record in response to the given record being outside of a scope of the IT domain.

25 Claims, 17 Drawing Sheets

(56) References Cited

U.S. PATENT DOCUMENTS

| | | | | |
|---|---|---|---|---|
| 11,343,146 | B1 | 5/2022 | Mohanty et al. | |
| 11,368,358 | B2 * | 6/2022 | Bahrami | G06F 16/35 |
| 11,556,843 | B2 | 1/2023 | Backas et al. | |
| 11,568,286 | B2 | 1/2023 | Nourian et al. | |
| 11,861,493 | B2 | 1/2024 | Vengertsev et al. | |
| 11,886,963 | B2 | 1/2024 | Welsh et al. | |
| 11,928,182 | B1 * | 3/2024 | Arici | G06N 5/01 |
| 12,265,461 | B2 | 4/2025 | Kozhaya et al. | |
| 2017/0032035 | A1 | 2/2017 | Gao et al. | |
| 2017/0178038 | A1 | 6/2017 | Guven et al. | |
| 2019/0132191 | A1 | 5/2019 | Mann et al. | |
| 2019/0354810 | A1 | 11/2019 | Samel et al. | |
| 2020/0184272 | A1 | 6/2020 | Zhang et al. | |
| 2020/0193243 | A1 | 6/2020 | Dhurandhar et al. | |
| 2020/0204431 | A1 * | 6/2020 | Bahrami | G06F 16/35 |
| 2021/0049512 | A1 * | 2/2021 | Chatterjee | G06N 5/025 |
| 2021/0073627 | A1 | 3/2021 | Sarferaz | |
| 2021/0097433 | A1 | 4/2021 | Olgiati et al. | |
| 2021/0133610 | A1 | 5/2021 | Natesan Ramamurthy et al. | |
| 2021/0174168 | A1 | 6/2021 | Dalli et al. | |
| 2021/0304057 | A1 | 9/2021 | Kundu et al. | |
| 2021/0312336 | A1 | 10/2021 | Sinn et al. | |
| 2021/0328888 | A1 * | 10/2021 | Rath | G06F 18/22 |
| 2022/0050918 | A1 | 2/2022 | Macedo | |
| 2022/0092469 | A1 | 3/2022 | Bremer et al. | |
| 2022/0107858 | A1 | 4/2022 | Jain et al. | |
| 2022/0156134 | A1 | 5/2022 | Lehmann et al. | |
| 2022/0198295 | A1 | 6/2022 | Singla et al. | |
| 2022/0215323 | A1 * | 7/2022 | Dake | G06F 40/40 |
| 2022/0245461 | A1 * | 8/2022 | Sern | G06N 3/0442 |
| 2022/0335315 | A1 | 10/2022 | Zonca et al. | |
| 2023/0222358 | A1 | 7/2023 | Wu et al. | |
| 2023/0236960 | A1 | 7/2023 | Dzhuraeva et al. | |
| 2023/0259807 | A1 | 8/2023 | Rawat et al. | |
| 2023/0281518 | A1 | 9/2023 | Verma et al. | |
| 2023/0316196 | A1 * | 10/2023 | Sewak | G06F 40/20 705/7.36 |
| 2023/0319099 | A1 | 10/2023 | Karimibiuki et al. | |
| 2023/0368028 | A1 | 11/2023 | Lupesko et al. | |
| 2023/0401829 | A1 | 12/2023 | Liu et al. | |
| 2024/0169271 | A1 | 5/2024 | Noppen et al. | |
| 2024/0212795 | A1 | 6/2024 | Freer et al. | |
| 2024/0220579 | A1 | 7/2024 | Mhatre et al. | |
| 2024/0255939 | A1 | 8/2024 | Kanazawa et al. | |
| 2024/0414064 | A1 | 12/2024 | Ayachitula et al. | |

FOREIGN PATENT DOCUMENTS

| | | | |
|---|---|---|---|
| JP | 2018180759 | A | 11/2018 |
| JP | 2019101495 | A | 6/2019 |
| JP | 2020091836 | A | 6/2020 |
| WO | 2022057425 | A1 | 3/2022 |

OTHER PUBLICATIONS

A. Revina, K. Buza and V. G. Meister, "IT Ticket Classification: The Simpler, the Better," in IEEE Access, vol. 8, pp. 193380-193395, 2020. (Year: 2020).*

N. Madaan, G. Singh, A. Kumar and G. B. Dasgupta, "Neev: A cognitive support agent for content improvement in hardware tickets,"2017 IFIP/IEEE Symposium on Integrated Network and Service Management (IM), Lisbon, Portugal, 2017, pp. 239-246. (Year: 2017).*

X. Wei, A. Sailer, R. Mahindru and G. Kar, "Automatic Structuring of IT Problem Ticket Data for Enhanced Problem Resolution," 2007 10th IFIP/IEEE International Symposium on Integrated Network Management, Munich, Germany, 2007, pp. 852-855. (Year: 2007).*

C. Ramya, P. Paramesh, S. Shreedhara, "Classifying the Unstructured IT Service Desk Tickets Using Ensemble of Classifiers", 3rd IEEE International Conference on Computational Systems and Information Technology for Sustainable Solutions, 2021. (Year: 2021).*

Ayachitula, et al. "Explainable Classifications With Abstention Using Client Agnostic Machine Learning Models," U.S. Appl. No. 18/300,699, filed Apr. 14, 2023.

Kyndryl: List of Kyndryl Patents or Patent Applications Treated as Related (Appendix P); Date Filed: Apr. 17, 2023; 2 pages.

Ayachitula, et al. "Self-Learning Automated Information Technology Change Risk Prediction," U.S. Appl. No. 18/331,361, filed Jun. 8, 2023.

Kyndryl: List of Kyndryl Patents or Patent Applications Treated as Related (Appendix P); Date Filed: Jun. 9, 2023; 2 pages.

Anonymous, "Natural language processing—Wikipedia," URL: https://en.wikipedia.org/wiki/Natural_language_processing; Retrieved: Feb. 1, 2024; 13 pages.

International Search Report and Written Opinion; Application No. PCT/EP2023/071905; Filed: Aug. 8, 2023; Date of mailing: Feb. 6, 2024; 11 pages.

International Search Report and Written Opinion; Application No. PCT/EP2023/063772; Filed: May 23, 2023; Date of mailing; Jan. 15, 2024; 15 pages.

* cited by examiner

100

CONFUSION MATRIX

Legend: mis-classification; correct classification

Labels predicted by the classifier

| Training data labels | Application Down | Database Space issue | Disk Handler | Network Connectivity | FileSystem Mount Handler | High Disk Space Usage Handler | High Memory & Page File Usage | Hostdown Handler | Service Handler | Job Abends |
|---|---|---|---|---|---|---|---|---|---|---|
| Application Down | 6610 | 68 | 3 | 0 | 0 | 0 | 2 | 36 | 1 | 26 |
| Database Space Issue | 33 | 66161 | 27 | 0 | 5 | 1 | 10 | 163 | 1 | 211 |
| Disk Handler | 2 | 46 | 160506 | 0 | 0 | 1620 | 9 | 24 | 1 | 38 |
| Network Connectivity | 0 | 0 | 0 | 1414 | 0 | 0 | 0 | 0 | 0 | 0 |
| FileSystem Mount Handler | 0 | 0 | 0 | 0 | 1710 | 1 | 0 | 0 | 0 | 0 |
| High Disk Space Usage Handler | 0 | 1 | 429 | 0 | 0 | 27353 | 0 | 1 | 3 | 4 |
| High Memory & Page File Usage | 0 | 11 | 4 | 0 | 0 | 0 | 58603 | 8 | 8 | 2 |
| Hostdown Handler | 50 | 296 | 43 | 0 | 0 | 3 | 11 | 195397 | 19 | 63 |
| Service Handler | 32 | 2 | 1 | 0 | 0 | 0 | 1 | 36 | 73266 | 1 |
| Job Abends | 7 | 226 | 43 | 0 | 0 | 0 | 6 | 98 | 1 | 214591 |

FIG. 4A

Coefficient Matrix

| Features | Class Labels | | | | | | | |
|---|---|---|---|---|---|---|---|---|
| | Service Handler | Disk Handler | Hostdown Handler | Database Space Issue | SAP Batch Jobs | Job Abends | Missed and Failed Backup | System Disk |
| backup | -25.1 | -21.76 | -7.16 | -24.96 | -21.36 | 0 | 19.59 | -7.56 |
| space | -13.94 | 15.6 | -6.43 | -28.65 | -22.03 | 0 | 0 | 0 |
| unreachable | -14.62 | 0 | 20.56 | -12.14 | -10.33 | 0 | -12.32 | 0 |
| workspace | -15.87 | 19.53 | 0 | -14.48 | -16.18 | 0 | -6.52 | 0 |
| response | -11.33 | 0 | 16.38 | -9.76 | -9.83 | 0 | -6.19 | 0 |

FIG. 4B

FIG. 5A

UNIVERSE OF PERTINENT POSITIVES

| PREDICTED LABELS | PERTINENT POSITIVES |
|---|---|
| DISK HANDLER | • LOW SPACE<br>• DISK C: HANDLER<br>• FILE SYSTEM |
| CPU HANDLER | XYZ |
| MEMORY HANDLER | ABC |
| ••• | ••• |

| Feature removal | | |
|---|---|---|
| Class/Label | Feature | Coefficient |
| Application Down | space | -6.05 |
| Database Inactive/Locked | space | -19.43 |
| Database Space issue | space | -28.65 |
| Disk Handler | space | 15.60 |
| Network Connectivity | space | -0.69 |
| FileSystem Mount Handler | space | 1.70 |
| High Memory & Page File Usage Handler | space | -12.38 |
| Hostdown Handler | space | -6.43 |
| Process CPU Spike Handler | space | -10.74 |
| Process Down Handler | space | -16.06 |
| SAP Batch Jobs | space | -22.03 |
| Service Handler | space | -13.94 |
| Too Many Daemons | space | -1.85 |
| Zombies handler | space | -1.71 |

Pertinent Positive (PP) Pertinent Negative (PN)

FIG. 5B

EXPLAINABLE CLASSIFICATIONS WITH ABSTENTION USING CLIENT AGNOSTIC MACHINE LEARNING MODELS

BACKGROUND

The present invention generally relates to computer systems, and more specifically, to computer-implemented methods, computer systems, and computer program products configured and arranged to provide explainable classifications with abstention using client agnostic machine learning models.

An information technology (IT) ticketing system is a tool used to track IT service requests, events, incidents, and alerts that might require additional action from the IT department. Ticketing software allows organizations to resolve their internal IT issues by streamlining the resolution process. The elements they manage, called tickets, provide context about the issues, including details, categories, and any relevant tags.

The ticket often contains additional contextual details and may also include relevant contact information of the individual who created the ticket. Tickets are usually employee-generated, but automated tickets may also be created when specific incidents occur and are flagged. Once a ticket is created, it is assigned to an IT agent to be resolved. Effective ticketing systems allow tickets to be submitted via a variety of methods. These include submissions through virtual agents, phone, email, service portals, live agents, walk-up experience, etc.

In general, automation systems automate aspects of the environment and problem resolution, event monitoring software monitors components and the environment, and incidents are reported via tickets through the ticketing system. A typical system may use natural language to monitor a ticket and output, via general language classifiers, what the problem is. Unfortunately, while general language classifiers handle general text well, they do not handle tickets that contain technical data well and do not explain how they arrived at the decision. What is needed is a system that can analyze technical issues, categorize the technical issues, and/or detect those issues for which no action is needed.

SUMMARY

Embodiments of the present invention are directed to computer-implemented methods for providing explainable classifications with abstention using client agnostic machine learning models. A non-limiting computer-implemented method includes inputting, by a processor, records to a machine learning model, the records being associated with an information technology (IT) domain. The computer-implemented method includes classifying, by the processor, the records with labels using the machine learning model. The machine learning model utilizes a method of abstaining from classifying a given record in response to the given record being outside of a scope of the IT domain.

This can provide an improvement over known methods for classification by providing the machine learning model with the ability to abstain from classifying tickets that are not relevant. This avoids tickets from being automatically processed by an automated system to erroneously change software and/or hardware components in one or more computer systems, based on a ticket should never have been classified.

In addition to one or more of the features described above or below, the machine learning model in conjunction with an abstinence method identifies the given record outside of the IT domain as unclassified. This advantageously allows the machine learning model to avoid classifying the given ticket that is not in the IT domain, thereby preventing the automated system from erroneously changing software and/or hardware components in one or more computer systems, based on a ticket that should never have been classified.

In addition to one or more of the features described above or below, the machine learning model is trained on training data in the IT domain. The machine learning model is more accurate and specific to the IT domain based on the training. This advantageously allows the machine learning model to avoid classifying the given ticket that is not in the IT domain, thereby preventing the automated system from erroneously changing software and/or hardware components in one or more computer systems, based on a ticket that should never have been classified.

In addition to one or more of the features described above or below, the machine learning model is trained by receiving input of training data comprising training records and corresponding labels to the training records, and the classification mechanism, employing the aforesaid machine leaning model is improvised to abstain from classifying any record outside of the IT domain by leveraging the abstention mechanism. The overall classification is more accurate and specific to the IT domain based on the training. This advantageously allows the machine learning model to avoid classifying the given ticket that is not in the IT domain, thereby preventing the automated system from erroneously changing software and/or hardware components in one or more computer systems, based on a ticket that should never have been classified.

In addition to one or more of the features described above or below, the records and the labels are provided to an automated resolution system, the automated resolution system being configured to modify at least one component in an IT environment of an industry. This advantageously provides automated modification to a software and/or hardware component in one or more computer systems, in response to a technical problem in the IT environment.

In addition to one or more of the features described above or below, a given record outside of the scope of the IT domain is prevented from being provided to the automated resolution system, thereby avoiding any component in the IT environment from being modified based on an incorrect classification of the given record. This advantageously provides automated modification to a software and/or hardware component in one or more computer systems, in response to a technical problem in the IT environment. Concurrently, this advantageously allows the aforementioned classification mechanism to avoid classifying the given ticket that is not in the IT domain, thereby preventing the automated system from erroneously changing software and/or hardware components in one or more computer systems, based on a ticket that should never have been classified.

In accordance with one or more embodiments, a non-limiting computer-implemented method includes inputting, by a processor, records to a linear classifier (machine learning algorithm); the records being associated with an information technology (IT) domain. The non-limiting method includes classifying, by the processor, the records with labels using the linear classifier algorithm, the linear classifier algorithm abstaining from classifying a given record in response to the given record being outside of a scope of the IT domain.

This can provide an improvement over known methods for classification by providing the abstention mechanism with the ability to abstain from classifying tickets that are not in the IT domain. The classification mechanism is more accurate and specific to the IT domain. Further, this avoids tickets from being automatically processed by an automated system to erroneously change software and/or hardware components in one or more computer systems, based on a ticket should never have been classified.

In addition to one or more of the features described above or below, the abstention mechanism (using the linear classifier algorithm) identifies a given record outside of the IT domain as unclassified. This advantageously allows the machine learning model to avoid classifying the given ticket that is not in the IT domain, thereby preventing the automated system from erroneously changing software and/or hardware components in one or more computer systems, based on a ticket that should never have been classified.

In addition to one or more of the features described above or below, the linear classifier algorithm is trained on training data in the IT domain. The abstention mechanism extracts pertinent positive (PP) and pertinent negatives (PN) features for the labels; the PPs and PNs are verified by domain experts. This advantageously improves the accuracy of the classifier as it avoids classifying the given ticket that is not in the IT domain, thereby preventing the automated system from erroneously changing software and/or hardware components in one or more computer systems, based on a ticket that should never have been classified.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4A depicts a block diagram illustrating an example confusion matrix of the machine learning model according to one or more embodiments of the present invention;

FIG. 4B depicts a block diagram illustrating an example coefficient matrix of the machine learning model according to one or more embodiments of the present invention;

FIG. 5A depicts an example chart illustrating the universe of the pertinent positive features determined to positively contribute to each of the predicted labels during the classification by the machine learning model according to one or more embodiments of the present invention;

FIG. 5B depicts an example chart illustrating how a particular feature contributes to the determination of class labels according to one or more embodiments of the present invention;

DETAILED DESCRIPTION

Figure 1:
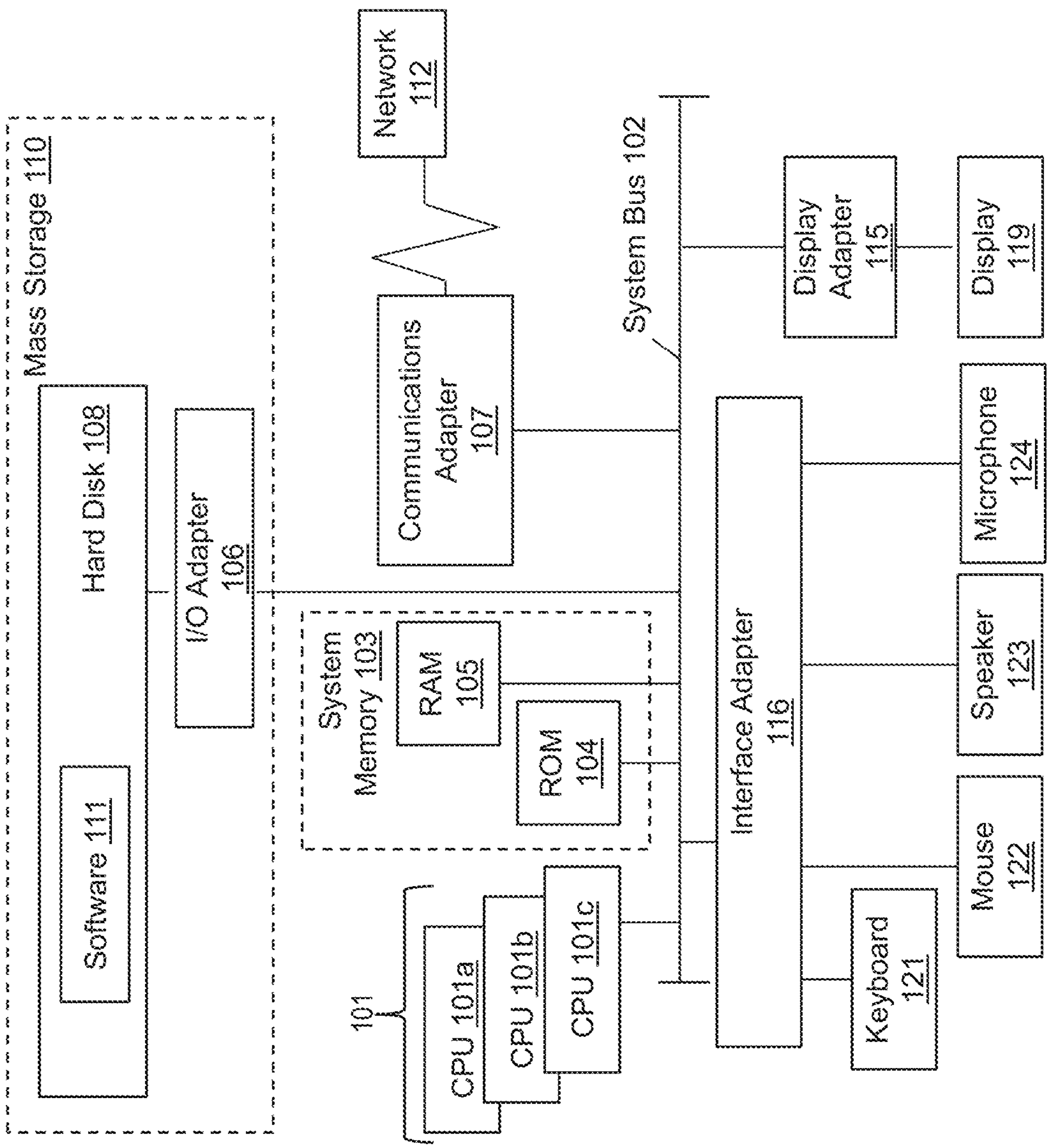
FIG. 1 depicts a block diagram of an example computer system for use in conjunction with one or more embodiments of the present invention.

One or more embodiments provide explainable classifications with abstention using client agnostic machine learning models. For all of the set of tickets that exist in a client's environment, the client agnostic machine learning model is configured to determine the next best action to resolve the computer/network issue. The client agnostic machine learning model is trained on tickets and resolutions from various different clients, which includes clients across different industries such as cyber security, financial, government, manufacturing, school, retail, cloud computing, data storage, etc., in order to become client agnostic or industry agnostic. According to one or more embodiments, the client agnostic machine learning model is trained such that when analyzing tickets, the client agnostic machine learning models knows when to classify tickets and when not to classify tickets. This may be accomplished building an agnostic machine learning model that only categorizes the scope it understands, for example, the information technology (IT) domain or IT environment, and for those scopes it does not understand, the agnostic machine learning model abstains from categorizing. Further, one or more embodiments are configured to explain how the agnostic machine learning model arrived at a particular decision, which provides the user with confidence in the decisions of the agnostic machine learning model.

Incident identification and automated resolution is the process of managing IT service disruptions and restoring services. For example, a monitoring system monitors the IT environment of a client in an industry. The term "IT environment" refers to the infrastructure, hardware, software, and systems that a client (entity or business) relies on every day in the course of using information technology. Some of the commonly used resources in an IT environment include computers, internet access, peripheral devices, etc. Examples in the IT environment may include the following: hardware: routers, personal computers, servers, switches, and data centers; software: user applications, web servers and applications that make hardware connections effective and useable; and networking: firewalls, cables, and other components that facilitate internal and external communication in a business. Upon detection of a technical event in the IT environment and/or upon the request of a user of the IT environment, the monitoring system generates a ticket. The ticket can be sent to an automated resolution system and/or the IT department to be resolved. A ticket is a special document or record that represents an incident, alert, request, and/or event that requires action from the IT department. Also, a ticket is an historical document that details a service event, such as an incident, problem, and/or service request. Tickets govern and control how a service event is processed.

A typical system may monitor an environment and attempt to identify the problem. However, general language classifiers handle general text well, but they do not handle tickets that contain technical data well, and they do not explain how they arrived at the decision. Further, classifiers are not good at abstaining from categorization. For example, a ticket that says the "first human in space was in 1961" should not be classified as a technical problems/issue, but most classifiers will analyze the ticket, detect the word "space", and erroneously categorize it as a disk handler problem.

Technical solutions and benefits include a system that provides client/industry agnostic models for the IT environment according to one or more embodiments. As such, thousands of different agnostic machine learning models are not required for thousands are different clients or industries, but the agnostic machine learning model works across various clients in different industries. In one or more embodiments, the agnostic machine learning model is configured to abstain from classifying an input that is outside of the IT environment or IT domain. This allows the agnostic machine learning model (e.g., a classifier) to avoid misclassifying a ticket with a label for automatic resolution by an automated resolution system, when, in fact, no label should be generated because the ticket (as input) is not in the IT environment or IT domain. Further technical solutions and benefits may include providing machine learning explanations of the decision making for the agnostic machine learning model, using disjunctive normal form (DNF) and/or pertinent positive features. One or more embodiments provide dimensional reduction using a gradient threshold shrinkage method to extract pertinent positives, as a list of all the features that are influencing the agnostic machine learning model (e.g., classifier). Some embodiments may not have these potential benefits or advantages, and these potential benefits or advantages are not necessarily required of all embodiments.

One or more embodiments described herein can utilize machine learning techniques to perform tasks, such as classifying a feature of interest. More specifically, one or more embodiments described herein can incorporate and utilize rule-based decision making and artificial intelligence (AI) reasoning to accomplish the various operations described herein, namely classifying a feature of interest. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," "a trained classifier," and/or "trained machine learning model") can be used for classifying a feature of interest, for example.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101*a*, 101*b*, 101*c*, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
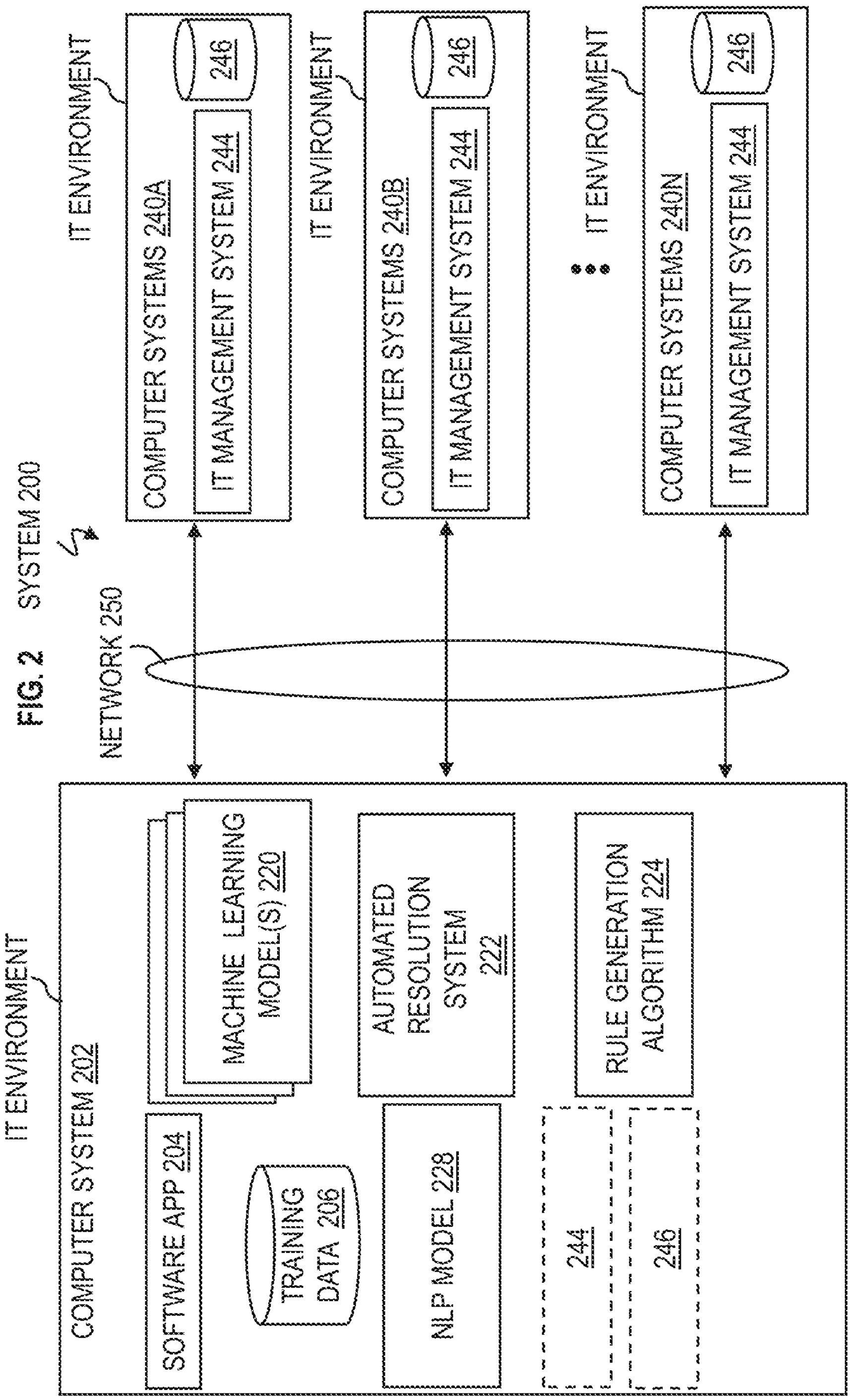
FIG. 2 depicts a block diagram of an example system configured to provide explainable classifications with abstention using a client agnostic machine learning model according to one or more embodiments of the present invention.

FIG. 2 depicts a block diagram of an example system 200 configured to provide explainable classifications with abstention using client agnostic machine learning models according to one or more embodiments. The system 200 includes a computer system 202 configured to communicate over a network 250 with many different computer systems, such as a computer system 240A for managing the IT environment for one client in one industry, a computer system 240B for managing the IT environment for another client in another industry, through a computer system 240N for managing the IT environment for yet another client of different industry. The computer systems 240A, 240B, through 240N can generally be referred to as computer systems 240. Each of the computer systems 240 has its own IT management system 244 for monitoring the IT environment for the respective clients of their respective industries and storing their respective tickets and resolutions in ticket repositories 246. The ticket repositories 246 are operable to store a large number of tickets and their respective resolutions for the IT environments of the computer systems 240. The network 250 can be a wired or wireless communication network.

The IT management system 244 may include or be representative of a monitoring and ticketing system and an automated resolution system for each client in the industry. By the software application 204 communicating over the network 250, which can be a wired or wireless communication network, with the computer systems 240, the software application 204 is configured to extract various tickets and their respective resolutions in the ticket repositories 246 from different clients in different industries.

In one or more embodiments, as illustrated with dashed lines, the computer system 202 may include respective IT management systems 244 and their ticket repositories 246 for one or more computer systems 240A-240N in their respective IT environments of clients. The computer system 202 can manage the IT environments of the clients for one or more computer systems 240A-240N. Any portion of the system 200 including the computer system 202 and one or more of the computer systems 240A-240N can be part of a cloud computing environment 50 (depicted in FIG. 13) as discussed further herein.

In system 200, the computer system 202, the computer systems 240A-240N, the IT management systems 244, the software application 204, training data 206, machine learning models 220, automated resolution system 222, rule generation algorithm 224, etc., can include and/or use any of the functionality discussed in computer system 100 including various hardware components and various software applications such as software 111 which can be executed as instructions on one or more processors 101 in order to perform actions according to one or more embodiments of the invention. The software application 204 can include, be integrated with, and/or call various other pieces of software, algorithms, application programming interfaces (APIs), etc., to operate as discussed herein. The software application 204 may be representative of numerous software applications.

The tickets and their respective resolutions are stored in repositories, such as storages, as training data 206. The software application 204 filters the training data 206 to ensure that the training data 206 is only in the IT environment, which can also be referred to as the IT domain or IT space. The IT domain encompasses the IT environments of the clients in respective industries. Any tickets that are not related to events (e.g., errors, issues, security breaches, malfunctioning computer equipment, etc.) in the IT domain are removed from the training data 206.

The computer system 202 includes a machine learning model 220, which is a client agnostic machine learning model that has been trained to classify tickets in the IT environment. In one or more embodiments, the client agnostic machine learning model is trained only to classify tickets in the IT environment, for example. The machine learning model 220 may be representative of numerous machine learning models 220. The machine learning model 220 classifies the tickets by predicting a label that identifies how to resolve the computer problem associated with ticket. The ticket and its predicted label can be sent to an automated resolution system 222 to automatically resolve the computer problem of the ticket according to the predicted label output from the machine learning model 220. In one or more embodiments, the machine learning model 220 is a linear classifier and processes linear classifier algorithms. The terms label, class, classification, classification label, class label, etc., may be utilized interchangeably to refer to a category in machine learning.

The linear classification algorithm uses an object's characteristics, such as the characteristics of the ticket, to identify which class (or group) it belongs to. The linear classifier achieves this by making a classification decision based on the value of a linear combination of the characteristics. An object's characteristics are also known as feature values and are typically presented to the machine in a vector called a feature vector. Example of linear classification algorithms and techniques includes Naïve Bayes algorithms, linear discriminant analysis (LDA) algorithms, least squares algorithms, support vector machine algorithms, ridge regression algorithms, Lasso algorithms, elastic net algorithms, least angle regression algorithms, orthogonal matching pursuit algorithms, Bayesian regression algorithms, logistic regression algorithms, linear regression algorithms, perception algorithms, passive aggressive classifier algorithms, etc., as understood by one of ordinary skill in the art.

The machine learning model 220 can be configured with a trained linear classification algorithm for each classification label for the tickets. Additionally, the machine learning model 220 is configured to abstain from classifying tickets that do not fall within the scope of the IT environment or IT domain. In one or more embodiments, with a classification label denoting unclassified/unknown in which the machine learning model 220 may be configured with a label unclassified/unknown to indicate that the feature vectors (i.e., features) of the ticket do not apply to the IT environment or IT domain. By abstaining to classify such tickets and/or by classifying such tickets that are not derived from and/or related to the IT environment as unclassified/unknown, the machine learning model 220 is configured to prevent a misclassified ticket from being incorrectly sent to the automated resolution system 222 and correspondingly having automated corrective actions performed on the IT environment by the automated resolution system 222. In one or more embodiments, the machine learning model 220 can prevent a misclassified ticket from being incorrectly sent to the automated resolution system 222 and correspondingly having faulty automated corrective actions performed on the IT environment. For example, one or more software and/or hardware components in the IT environment can be automatically changed by an automated resolution system based on an incorrect classification label of a ticket, thereby resulting in a malfunction of software and/or hardware components of computer systems in the IT environment.

Figure 3:
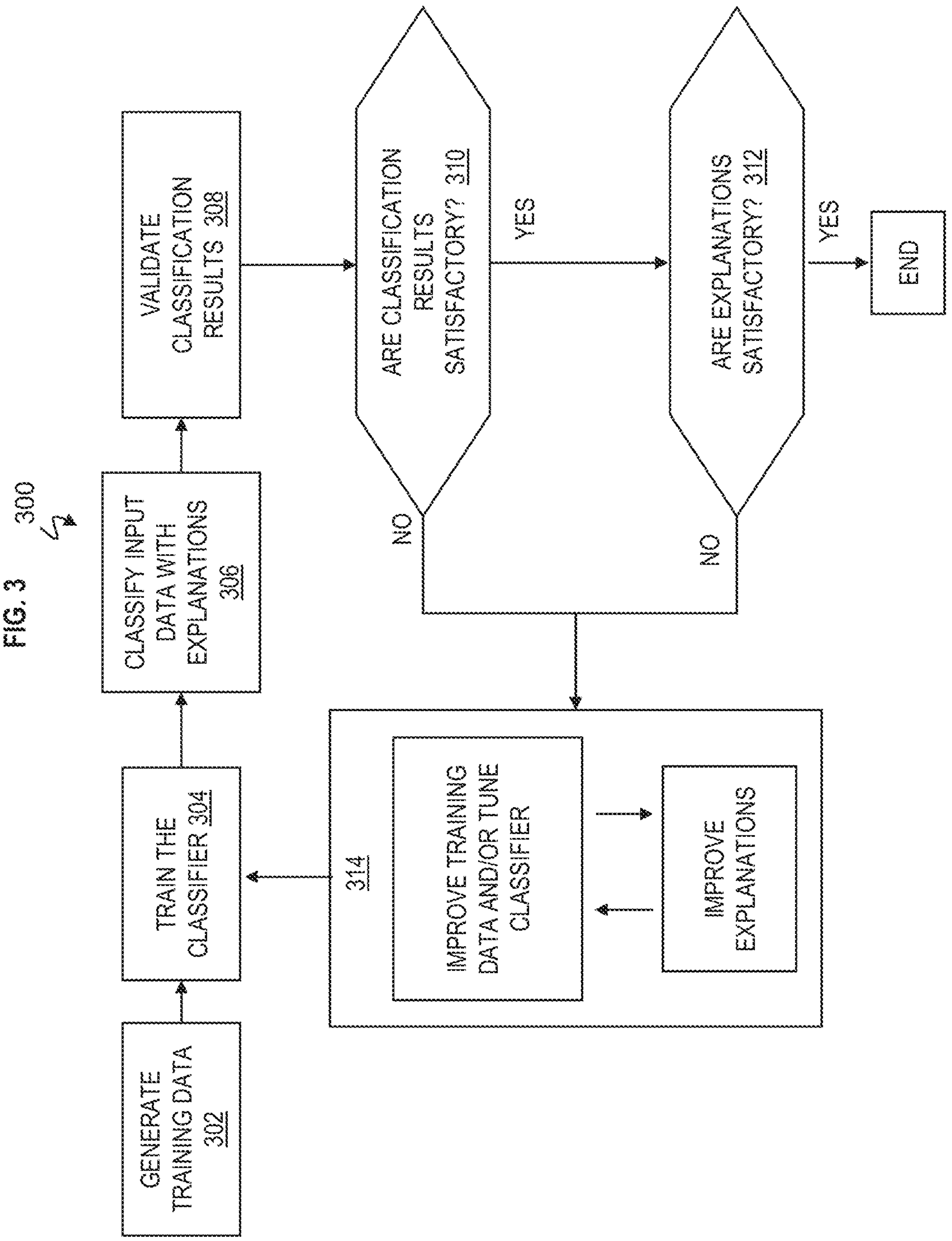
FIG. 3 is a flowchart of a computer-implemented method for training a machine learning model for each classification label according to one or more embodiments of the present invention.

FIG. 3 is a flowchart of a computer-implemented method 300 for training the machine learning model 220 having a linear classification algorithm for each classification label, resulting in the trained machine learning model 220, according to one or more embodiments. The computer-implemented method 300 is executed by the computer system 202.

At block 302 of the computer-implemented method 300, the software application 204 is configured to retrieve training data by compiling the data from each ticket into training data that is stored in the training data 206. The software application 204 can be configured to parse the training data 206 to determine and filter out any tickets along with their resolutions that do not belong in the IT environment. This leaves only tickets that are in the IT environment, which denote the IT domain, such that the machine learning model 220 is trained on and learns tickets and their respective resolutions that belong in the IT domain. In one or more embodiments, for example, the machine learning model 220 is only trained on and learns tickets and their respective resolutions that belong in the IT domain. Upon detecting a ticket that is not in the IT domain, machine learning model 220 abstains for labeling the ticket and/or this ticket may be labeled unclassified/unknown; as such, the ticket is prevented/blocked from being processed by the automated resolution system 222.

The training data 206 can be refined using cross-fold validations. For the training data 206, the tickets are labeled in preparation for training the machine learning model 220. For training data 206, the labels can be automation playbooks obtained by reconciling automation executions and the incident tickets being addressed. For example, the machine learning model 220 may be trained on tickets resolved by an automation platform (e.g., IT management system 244) such as, for example, Red Hat® Ansible® platform, and trained on tickets that have not been resolved by the automation platform. For example, when the automation platform (e.g., IT management system 244) receives a ticket, it will log into the system; if it has a playbook, the automation platform executes the playbook, resolves the ticket, and closes the ticket. A closed ticket is considered a fact or completed. The ticket is utilized to train the machine learning model 220 into one of the known example classes in the IT domain such as, for example, application down, database space issue, disk handler, network connectivity, file system mount handler, high disk space usage handler, high memory and page file usage, host down handler, service handler, job abends, etc. It should be appreciated that that the example list of classification label is not meant to be exhaustive.

At block 304, the software application 204 is configured to train the machine learning model 220 using the training data 206. For example, the data of each ticket (along with its corresponding label) is input to the machine learning model 220 as feature vectors, in order for the linear classifier algorithm of the machine learning model 220 to learn how to classify the input data of the ticket. The training data is labeled, which means that the tickets are labeled in advance to determine when the output of the machine learning model 220 predicts the correct label. During the training phase, the predicted labels of the tickets from the machine learning model 220 are compared to labels of the tickets in the training data 206 to continuously improve the machine learning model 220. This allows the machine learning model 220 to learn the correct classification label for each ticket.

At block 306, the machine learning model 220 is configured to classify the input data of the tickets with explanations. For example, each ticket is classified based on an underpinning and/or decision made by the machine learning model 220. The machine learning model 220 is configured generate an explanation to the user of a machine learning rule and/or as pertinent positive features on which the machine learning model 220 based its decision for the predicted label of the input ticket. In one or more embodiments, the machine learning model 220 may include and/or employ a rule generation algorithm 224 for the machine learning rule and/or the identified pertinent positive and pertinent negative features, and further details are discussed herein.

At block 308, the software application 204 is configured to validate the classification results by comparing the predicted classification label of the ticket to the label of the ticket in the training data. At block 310, the software application 204 is configured to check if the predicted classification label of the ticket matches the label of the ticket in the training data.

At block 312, if (Yes) there is a match, the software application 204 is configured to check if the explanation of the machine learning rule and/or the identified pertinent positive features is satisfactory. This may involve asking a subject matter expert for input and/or employing a natural language processor (NLP) system. If (Yes) the explanations are satisfactory, the software application 204 is configured to end training the machine learning model.

At block 314, when (No) the classification results are not satisfactory for the decision at block 310, the software application 204 is configured to improve the training data and/or tune the classifier algorithm. Also, when (No) the explanations are not satisfactory for the decision at block 312, the software application 204 is configured to improve the explanations.

It is noted that a separate linear classification algorithm is trained for each classification label. In one or more embodiments, the machine learning model 220 can include numerous linear classification algorithms, one for each classification label corresponding to the IT domain. In one or more embodiments, there can be numerous machine learning models 220, one for each classification label corresponding to the IT domain. Any discussion of a single linear classification algorithm and/or single machine learning model 220 applies by analogy to all linear classification algorithms and/or all machine learning models 220 corresponding to all the classification labels of the IT domain.

As noted herein, when the input ticket indicates "First human in space was in 1961" for a typical classifier, the typical classifier will attempt to classify the ticket with a label such as, for example, disk or disk handler. However, such a label is a misclassification in this example, which can lead to incorrect actions being taken by an automated resolution system.

As technical benefits and solutions, one or more embodiments are configured to abstain from classifying such a ticket indicating the "First human in space was in 1961" because the machine learning model 220 has been trained to abstain from classifying such a ticket. Rather, the machine learning model 220 may output unknown/unclassified, thereby preventing the automated resolution system 222 from modifying one or more software and/or hardware components in an IT environment of a client in an industry. Accordingly, based on the output from the machine learning model 220, the software application 204 can recognize that the ticket is unknown/unclassified in the IT domain and send the ticket to the IT department for resolution, instead of sending the ticket to the automated resolution system 222. The software application 204 is configured to send the tickets that have been properly labeled by the machine learning model 220 to the automated resolution system 222 for automated processing in the IT environment of the client in the industry. In accordance with the label from the machine learning model 220, the automated resolution system 222 is configured to modify software components, hardware components, and/or both software and hardware components of one or more computer systems in the IT environment, thereby resulting in improvements to the computer systems themselves. The modifications to the software and/or hardware components solve technical computer problems on the computer systems in the IT environment and are practical applications associated with use of the machine learning model 220.

One or more embodiments provide techniques for computing pertinent positive features in a ticket for text classification. The pertinent positive features are tokens in a ticket. Tokens can refer to one or more words, phrases, sentences, etc., in the text of a ticket, and the process if referred to as tokenization. The tokens can be utilized as features in the feature vector of a ticket. One or more embodiments extract a list of all pertinent positive features for all (IT) tickets, along with their labels, which can be utilized to further train the machine learning model 220 and for explanations as discussed herein.

Further, one or more embodiments are configured to generate a liner classifier for the machine learning model 220, generate a coefficient matrix and confusion matrix for insights into how the linear classifier works at a corpus level, use gradient descent iterative threshold shrinkage to extract the pertinent positives for all IT tickets, curate the pertinent positives with subject matter expert/IT domain expert to find "true" pertinent positives, extract rules and rule features as new training data sets for a given label, and create an enriched training model and a list of the universe of allowed pertinent positives. Accordingly, one or more embodiments can receive an incoming new incident ticket, extract the pertinent positives for a given ticket, and if any pertinent positives are not identified, the linear classifier abstains from classifying the ticket.

Referring to FIG. 4A, a block diagram depicts an example confusion matrix of the machine learning model according to one or more embodiments. FIG. 4B depicts a block diagram of an example coefficient matrix of the machine learning model according to one or more embodiments. The features of the tickets and labels of the confusion matrix in FIG. 4A are projected into the example coefficient matrix depicted in FIG. 4B.

To learn from mistakes, by probing the machine learning model 220, the software application 204 can generate the example confusion matrix that captures how the classifier gets confused in learning and classifying the training data in FIG. 4A. A confusion matrix is an N×N matrix used for evaluating the performance of a classification model, where N is the number of target classes. The matrix compares the actual target values in the training data 206 with those predicted by the machine learning model.

Referring to FIG. 4B, the coefficient matrix includes entries that represent signed coefficients of respective features for the hyperplanes in the binary linear classifiers for respective classes. The software application 204 is configured to identify features with the largest absolute coefficients, for example, the largest absolute coefficient values. Using the coefficient matrix, this provides the software application 204 with the most influential features for classification at a global level. The coefficient matrix, sometimes called a correlation matrix, is a table that displays the correlation coefficients for different variables. The coefficient matrix depicts the correlation between all the possible pairs of values in a table. It summarizes a large dataset and identifies and visualizes patterns in the given data.

In FIG. 4B, the features having a positive number in a given classification label indicate that the corresponding features are positively contributing to the decision of the machine learning model 220 for classification into the given classification label. On the other hand, features having a negative number (i.e., negative sign) for a given class label indicate that the corresponding features are not contributing (i.e., negative contribution) to classification into the given class label.

Based on all of the features in tickets (e.g., in training data 206) for all class labels, the software application 204 using the machine learning model 220 generates a universe of pertinent positive features for each predicted classification label as depicted in FIG. 5A. In FIG. 5A, the example chart shows the pertinent positive features, also referred to as pertinent positives, which are determined to positively contribute to each of the predicted labels during the classification by the machine learning model 220. For example, the pertinent positive features of "low space", "disk: c handler", and "file system" are the pertinent positive features that positively contribute to the predicted classification label "disk handler" in the classification by the machine learning model 220. The example classification label disk handler is utilized in various example scenarios for explanation purposes and not limitations. It should be appreciated that embodiments are not limited to the classification label disk handler.

FIG. 5B is a chart illustrating how the example feature "space" contributes to the determination of classification labels. As can be seen in FIG. 5B, the feature space has a positive coefficient for the classification label disk handler, which means that the feature space positively contributes to the decision of the machine learning model 220 to output the classification label disk handler. Similarly, the feature space has negative coefficient for some other classification labels, which means that the feature space negatively contributes or does not influence the decision of the machine learning model 220 to output the corresponding class label; as such, the feature space can be identified as a pertinent negative feature and removed as a feature for the corresponding classification labels, in which space has a negative coefficient. The software application 204 continues feature removal for any features identified has pertinent negative features that have a negative coefficient for a given classification label, thereby leaving only the pertinent positive features that can be utilized in the universe of pertinent positive features for respective classification labels as depicted in FIG. 5A.

Figure 5C:
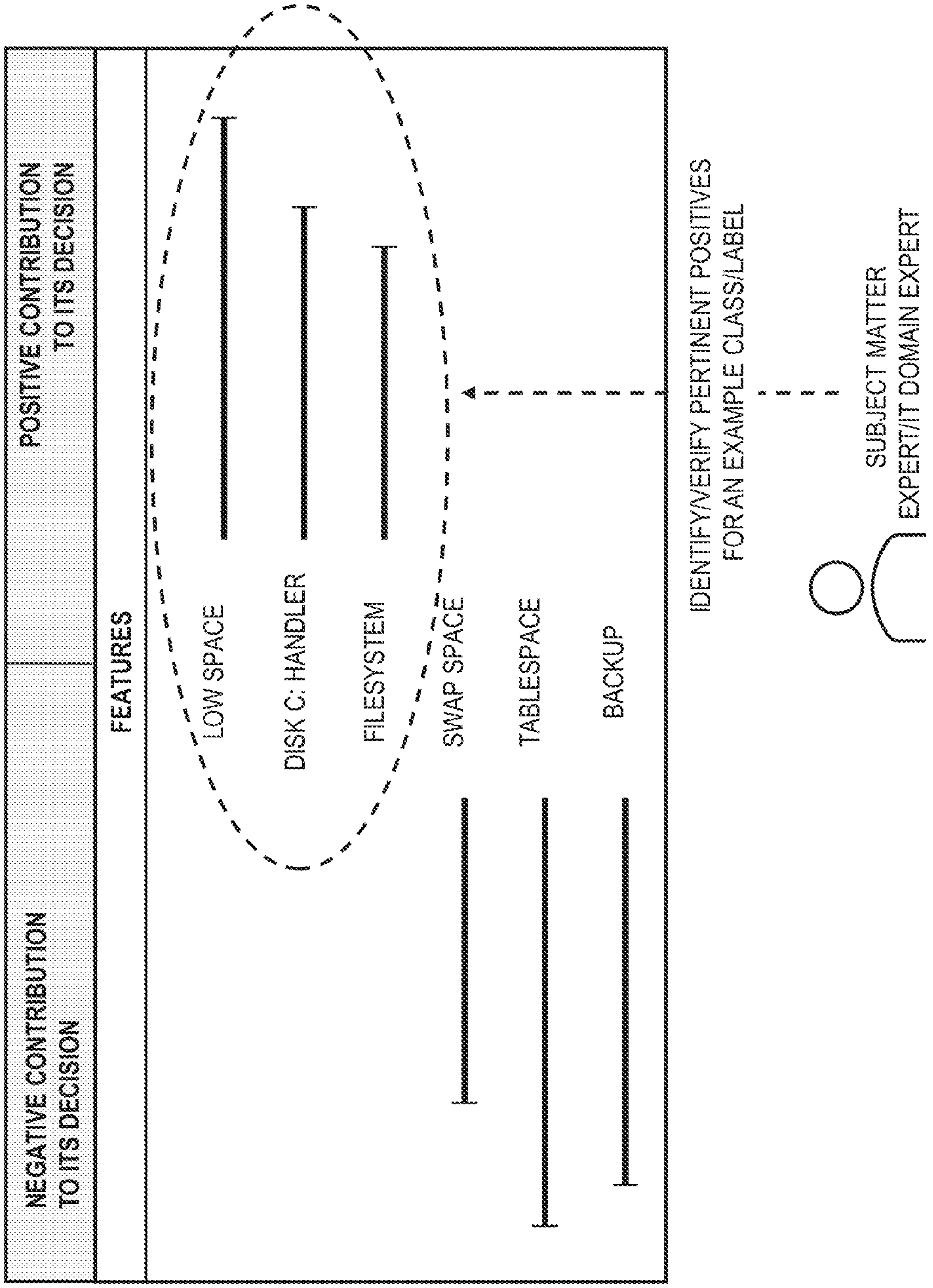
FIG. 5C depicts a graph illustrating the contributions of features that are analyzed by the machine learning model for determining a classification according to one or more embodiments of the present invention.

Continuing with the example scenario for the classification label disk handler, FIG. 5C is a graph illustrating the contributions of features that have been analyzed by the machine learning model 220 to make its classification of disk handler, which are now being verified by a human subject matter expert. For each feature, the graph shows its negative contribution to the decision and the positive contribution to the decision by the machine learning model 220 to classify a ticket with the label disk handler. The software application 204 identifies the pertinent positive features for a given class for verification by a subject matter expert, who confirms the pertinent positives features of, for example, "low space", "disk c: handler", and "file system" as positively contributing to the decision of the machine learning model 220. As identified by the software application 204, the subject matter expert confirms that all the pertinent positive features are true pertinent positive features for their respective classification labels, resulting in the universe of pertinent positive features for their labels as depicted in FIG. 5A. In one or more embodiments, the universe of pertinent positive features excludes any pertinent negative features. Accordingly, the pertinent positive features for their respective classification labels are collected and added to the training data 206 as new training datasets in the training data 206 for further training the machine learning model 220 to classify tickets with a classification label. In one or more embodiments, the pertinent positive features are verified pertinent positive features for their respective classification labels. This additional training further refines the ability of the machine learning model 220 to learn to abstain from classifying tickets that are not in the IT domain and improves the accuracy of the machine learning model 220.

During the inference phase, when the machine learning model 220 receives a ticket and outputs its classification label, the software application 204 can probe the machine learning model 220 to obtain the pertinent positive features for any ticket. Also, for an incoming ticket, the machine learning model 220 learns to extract and recognize the pertinent positive features for the given ticket, and when there are no pertinent positive features found in the ticket, the machine learning model 220 is configured to abstain from classifying the ticket. On the other hand, when the pertinent positive features are recognized in the ticket, the machine learning model 220 is configured to classify the ticket, highlight the pertinent positive features for display (on display 119) to the user, and extract the classifier rules using the disjunctive normal form to explain the machine learning model decision.

Figure 6:
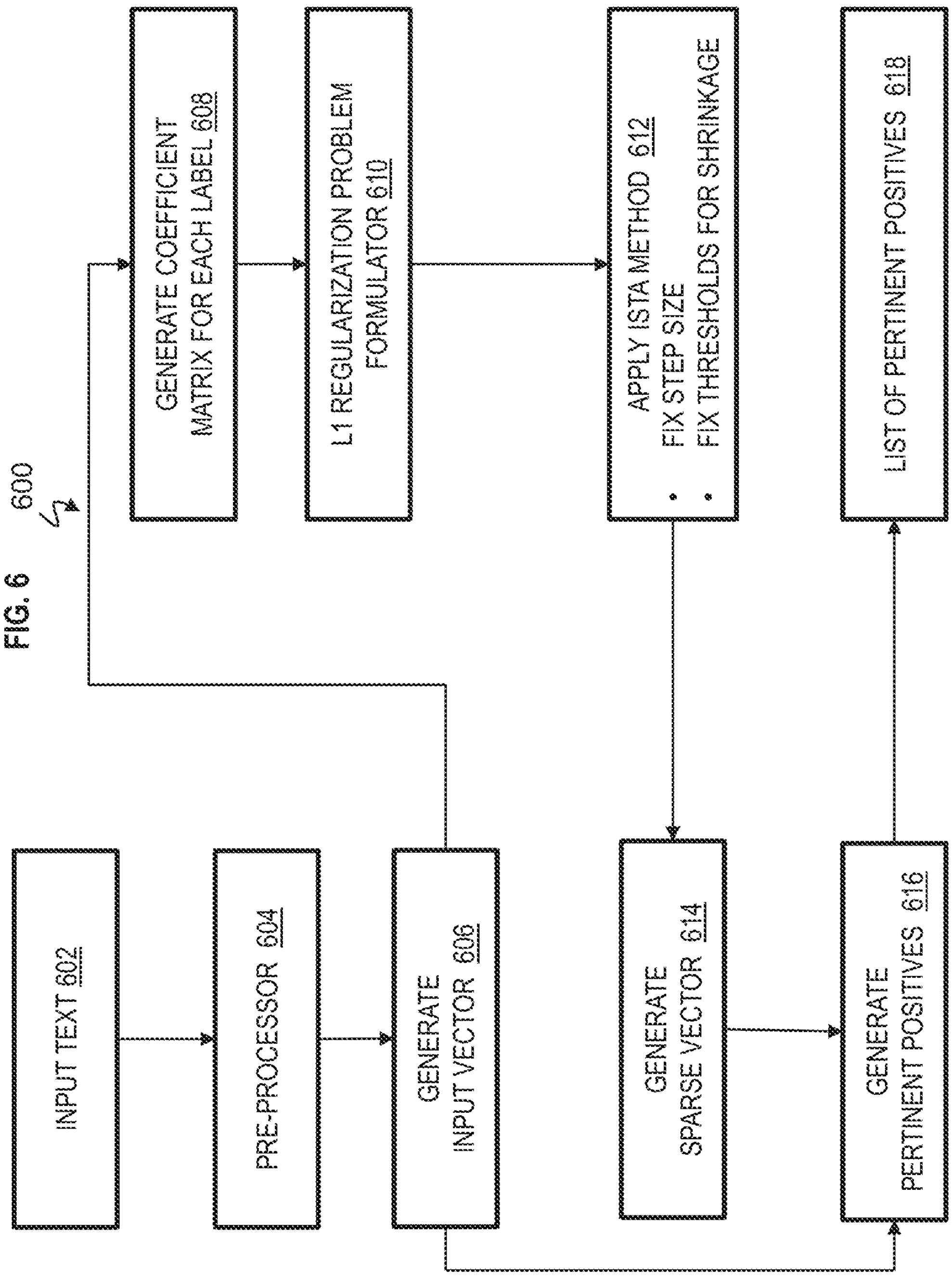
FIG. 6 is a flowchart of a computer-implemented method for computing pertinent positive features for classification according to one or more embodiments of the present invention.

FIG. 6 is a flowchart of a computer-implemented method 600 for computing pertinent positive features for text classification according to one or more embodiments. In one or more embodiments, the software application 204 employs, utilizes, and/or is integrated with the machine learning model 220 to execute the computer-implemented method 600. Further, the software application 204 may be utilized to probe the machine learning model 220 to perform the computer-implemented method 600.

At blocks 602, 604, 606, the software application 204 is configured to input text of an incident ticket to a pre-processor in order to generate a feature vector from the input text. The pre-processor extracts input features from the text, and the features are formed into a feature vector. A known technique can be utilized for conversion of the text into a feature vector. The feature vector is input to the machine learning model 220, which outputs a classification label for the corresponding ticket.

At block 608, the software application 204 is configured to build a confusion matrix and generate a coefficient matrix for each label output by the machine learning model 220. An example confusion matrix and coefficient matrix are respectively illustrated in FIGS. 4A and 4B.

At block 610, the software application 204 is configured to feed the feature vector and coefficient matrix to an L1 (and/or L2) regularization problem that models the pertinent positives. An example regression model that uses the L1 regularization technique is called the least absolute shrinkage and selection operator (lasso) regression, and an example regression model that uses the L2 regularization technique is called ridge regression. For L1 regularization, the lasso regression adds an "absolute value of magnitude" of coefficient as penalty term to the loss function. L1 regularization may be the choice when there are a high number of features as it provides sparse solutions. For L2 regularization, the ridge regression adds a "squared magnitude" of coefficient as a penalty term to the loss function. L2 regression can be used to estimate the significance of predictors and based on that it can penalize the insignificant predictors. Additionally, an elastic net is when L1 and L2 regularization combine together, and the combination becomes the elastic net method, which adds a hyperparameter.

At block 612, the software application 204 is configured to apply an iterative shrinkage/thresholding algorithm (ISTA) to the L1 (and/or L2) regulation problem. The ISTA is widely used in solving linear inverse problems because of its simplicity. The ISTA may include gradient descent interactive threshold shrinkage.

At blocks 614 and 616, the software application 204 is configured generate a sparse feature vector by using ISTA method and select pertinent positive features from the sparse feature vector. The sparse feature vector for the classification label has fewer features than the original feature vector, in one or more embodiments. Accordingly, using all the sparse feature vectors generated for the respective classification labels in the IT domain, the software application 204 selects the features for each classification label to generate a list of pertinent positive features for each class label, which are output at block 618. As noted above, FIG. 5A represents a universe of pertinent positive features for each classification label, such as the example class label disk handler.

To further illustrate computing pertinent positive features for text classification, the following is an example scenario for explanation purposes and not limitation. ISTA algorithms are used to compute sparse solutions to inverse linear problems. A typical example of an inverse linear problem is linear regression. An example to consider is a classification problem, for example, the text classification problem. One can use any linear classification algorithm for a text classification problem in the IT ticket management domain. Now, consider a ticket T that gets classified into a class C (e.g., "disk handler") using a linear classification algorithm of the machine learning model 220. It is often beneficial to show "evidence" of the inner working of the classifier (e.g., machine learning model 220) and "explain" why ticket T was classified into class C. The pertinent positives in a ticket like T are a small subset of features of T that are responsible for its classification into class C. Such a set of features provides a good explanation of the inner working of the classifier according to one or more embodiments. As discussed in the example above, the disclosure formulates the problem of finding positive pertinent features for the text classification problem as a sparse inverse linear problem. One or more embodiments customize and simplify the ISTA algorithm to make it efficient for this use case. This customization considers the specific problem formulation that, for example, a passive aggressive classifier (PAC) uses internally and uses its structural properties to implement the iterative thresholding step efficiently.

One or more embodiments provide an explainability for decision of the machine learning model. This explains why the machine learning model 220 classified a given ticket with a given classification label. A typical IT domain has several stakeholders such as, for example, IT users, IT practitioners, service availability managers, incident ticket owners, incident ticket assignee, change owners, etc. Different stakeholders may need explanations with different complexities and depths of reasoning. According to one or more embodiments, explainability of the machine learning decision can be presented in the disjunctive normal form and/or using pertinent positive features. In Boolean logic, the disjunctive normal form is a canonical normal form of a logical formula consisting of a disjunction of conjunctions. The disjunctive normal form can be described in terms of "ORs", "ANDs", etc.

Figure 7:
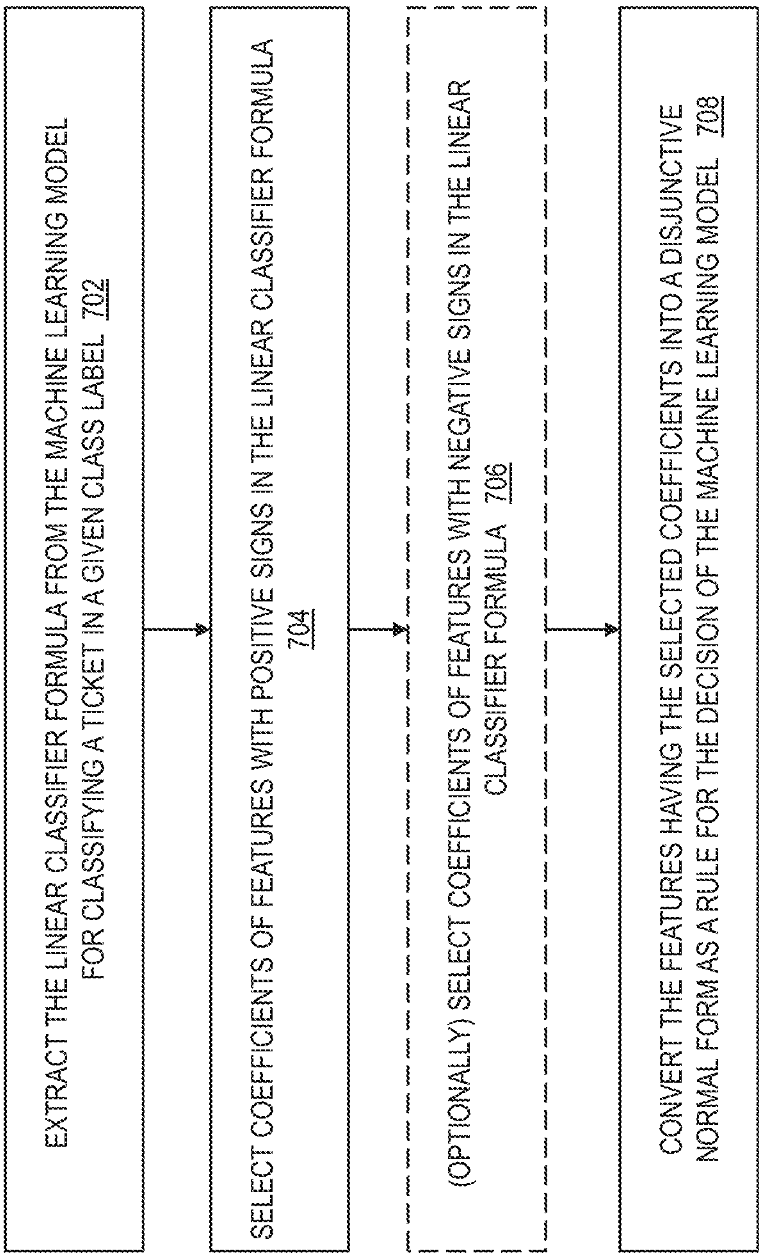
FIG. 7 is a flowchart of a computer-implemented method for explaining a machine learning decision using disjunctive normal form according to one or more embodiments of the present invention.

Turning to the explainability using the disjunctive normal form, FIG. 7 is a flowchart of a computer-implemented method 700 for explaining a machine learning decision using the disjunctive normal form according to one or more embodiments. FIG. 7 is explained with reference to FIG. 8, which is a block diagram illustrating converting a linear classifier formula into a disjunctive normal form according to one or more embodiments. The machine learning model 220 has received input of a ticket and has output the classification label as, for example, disk handler.

Figure 8:
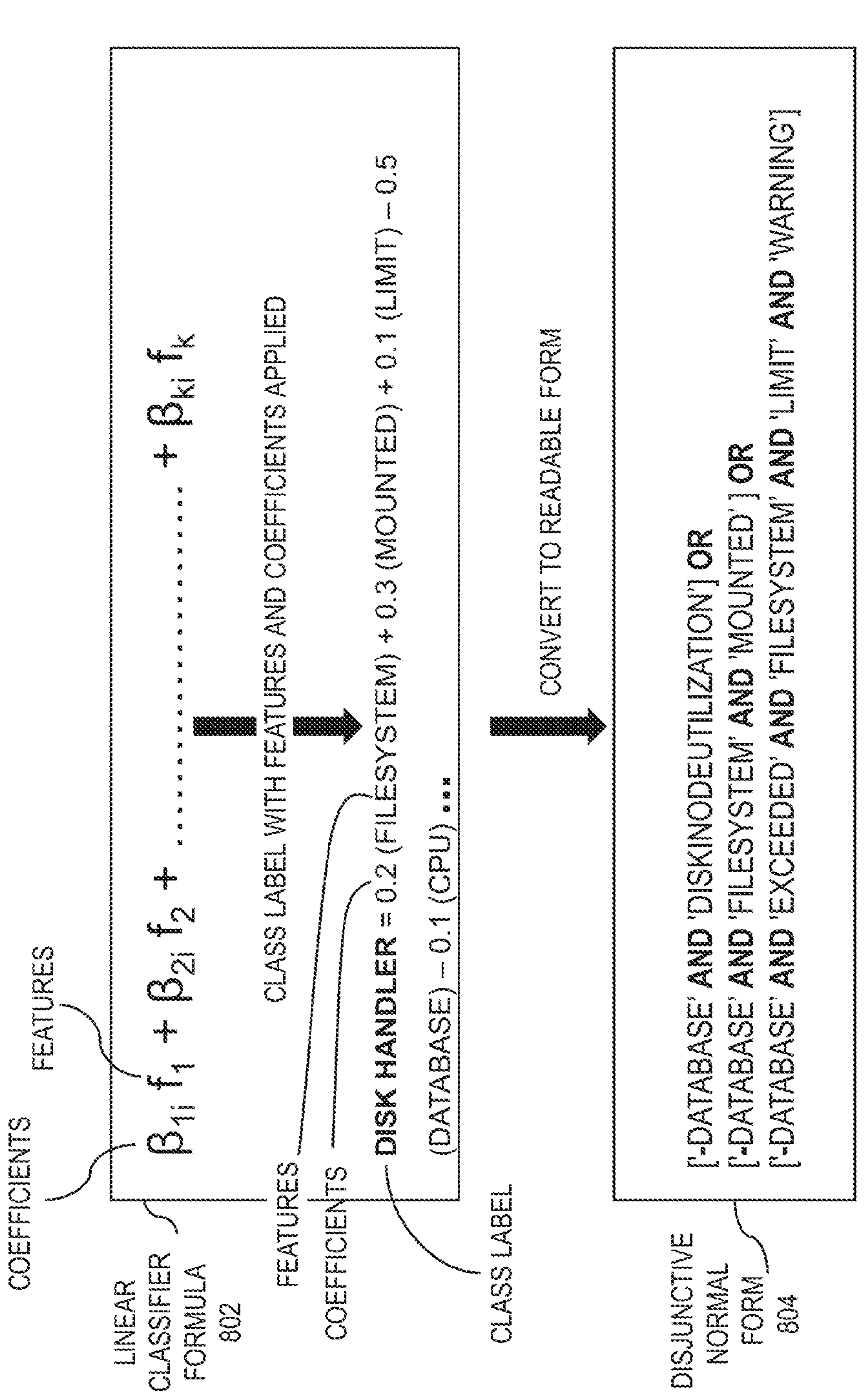
FIG. 8 depicts a block diagram illustrating converting a linear classifier formula into a disjunctive normal form according to one or more embodiments of the present invention.

At block 702 of the computer-implemented method 700, the software application 204 is configured to extract the linear classification formula from the machine learning model 220. An example linear classifier formula is depicted in block 802 of FIG. 8, as $\beta_{1i}\ f_1+\beta_{2i}\ f_2+\ .\ .\ .\ +\beta_{ki}\ f_k$, $\beta_{ki}$ represents the example coefficients for the kth feature, and $f_k$ represents the example features for a total of k features. In FIG. 8, the classification label that has been output is disk handler along with the coefficients as weights (which can be positive and negative weights) for each of the features. In the example, the linear classification formula of a class label for a given ticket is disk handler=0.2 (filesystem)+0.3 (mounted)+0.1 (limit)−0.5 (database)−0.1 (cpu) . . . , as depicted in block 802 of FIG. 8.

At block 704, the software application 204 is configured to select the coefficients (i.e., weights) of features with positive signs to be utilized (i.e., "ANDed" together) in the disjunctive normal form.

At block 706, optionally, the software application 204 is configured to select the coefficients (i.e., weights) of features with negative signs to be utilized (i.e., "ANDed" together) in the disjunctive normal form while keeping their negative signs. In one or more embodiments, the software application 204 may employ or call a natural language processing (NLP) model 228 to parse and analyze the features and their respective coefficients (negative and positive values) in the linear classification formula when executing blocks 704 and 706. In one or more embodiments, the NLP model 228 may be a known pretrained NLP model that is further trained on the features and their respective coefficients (negative and positive values) in the linear classification formula in order to select the features and their coefficients for use in the disjunctive normal form.

At block 708, the software application 204 is configured to convert the features having the selected coefficients into a disjunctive normal form as a rule for the decision of the machine learning model 220. In one or more embodiments, the software application 204 may only select features having coefficients with a positive value, may select features having coefficients with a positive value greater than a threshold, may select the features having coefficients with a positive value along with features having a negative coefficient value greater than a threshold. An example rule in the disjunctive normal form is illustrated in block 804 in FIG. 8. Particularly, block 804 illustrates three different example rules each separated by an "OR" as seen in FIG. 8. It is noted that the term database has a negative sign indicating its negative contribution to the classification label disk handler. In some embodiments, the negative sign may be replaced with "NOT" to represent a negative contribution. The example rules are displayed (on display 119) to the user of the machine learning model 220 to explain the decision making underling the class label, for example, disk handler, output by the machine learning model 220 for a given ticket.

In one or more embodiments, the software application 204 is configured employ/call a rule generation algorithm 224 to generate the rule in the disjunctive normal form. In one or more embodiments, the rule generation algorithm 224 may be a rules-based algorithm. An example of a rules-based system is a domain-specific expert system that uses rules to make deductions or choices. The rules-based system includes a set of facts or source of data related to capturing objects, and a set of rules for manipulating that data. These rules are sometimes referred to as "If statements" as they tend to follow the line of "IF X happens THEN do Y."

In one or more embodiments, the rule generation algorithm 224 may be a machine learning algorithm that has been trained on training data. For example, the training data includes liner classification formulas for each of the classification labels in the IT domain of tickets, where the training data includes the features and their corresponding coefficients that are positive and negative. During the training phase of the rule generation algorithm 224, a subject matter expert/IT expert can accept or reject the rule in disjunctive normal form for respective classes, thereby improving the rule generation algorithm as a machine learning algorithm. During the inference phase, when the rule generation algorithm 224 is implemented as a trained machine learning algorithm/model, the trained machine learning algorithm receives the input classification label, the features, and the respective coefficients in order to output the disjunctive normal form of the features and logic term (e.g., "AND", "OR", etc.) as depicted in block 804 in FIG. 8.

In describing the explainability using the disjunctive normal form, the machine learning model 220 may use a linear classifier, such as a passive aggressive classifier with unigram and bigrams as features. The presence or absence of these features gives the software application 204 information about the type of incident, for example, the type of ticket in one embodiment. Explaining the behavior of the machine learning model 220 (i.e., the classifier) helps the user gain trust in the classifier. Therefore, one or more embodiments explain the classification in a disjunctive normal form, which is a natural form of knowledge representation for humans.

Figure 9:
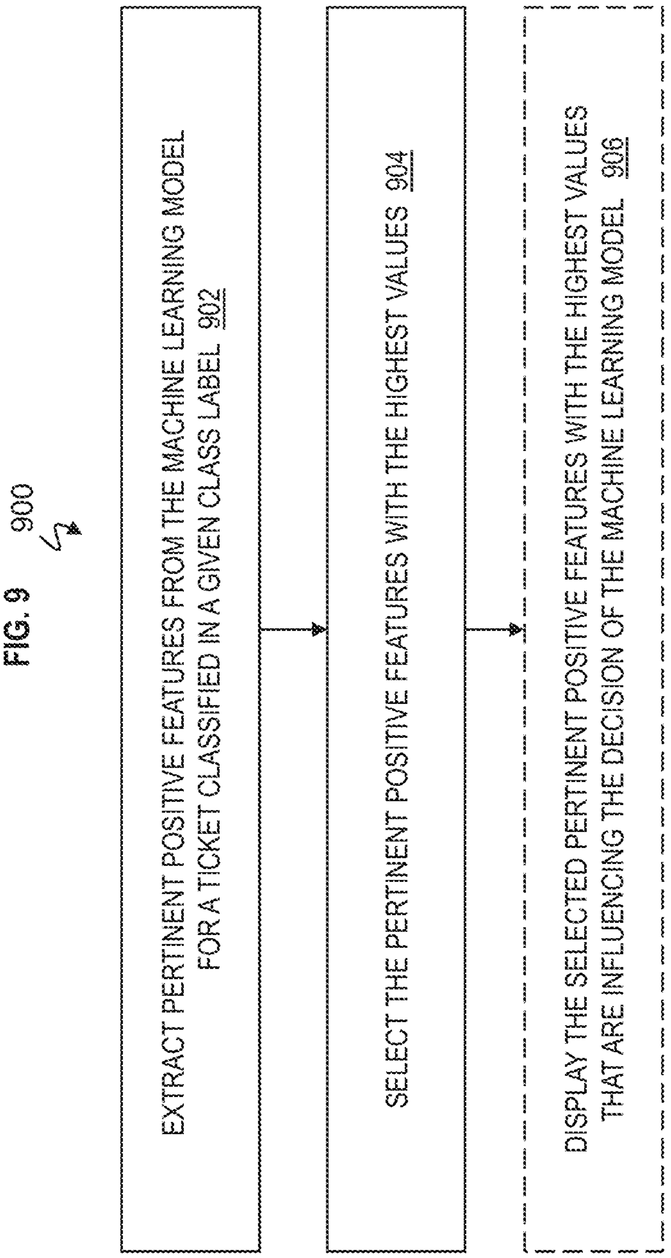
FIG. 9 is a flowchart of a computer-implemented method for explaining a machine learning decision using pertinent positive features according to one or more embodiments of the present invention.

Turning to the explainability using pertinent positive features, FIG. 9 is a flowchart of a computer-implemented method 900 for explaining a machine learning decision using pertinent positive features according to one or more embodiments. FIG. 9 is explained with reference to FIG. 10, which is a block diagram illustrating selecting features (e.g., tokens) from the data of a ticket and presenting the pertinent positive features contributing to the classification label for the ticket according to one or more embodiments. The machine learning model 220 has received input of a ticket and has output the classification label, for example, disk handler.

At block 902, the software application 204 is configured to extract the pertinent positive features from the machine learning model 220 for a ticket classified into a given classification label. Any technique discussed herein may be utilized for determining pertinent positive features for a classification label.

At block 904, the software application 204 is configured to select the pertinent positive features with the highest values, for example, above a predetermined threshold. Example pertinent positive features are illustrated in FIGS. 5A and 5C.

Figure 10:
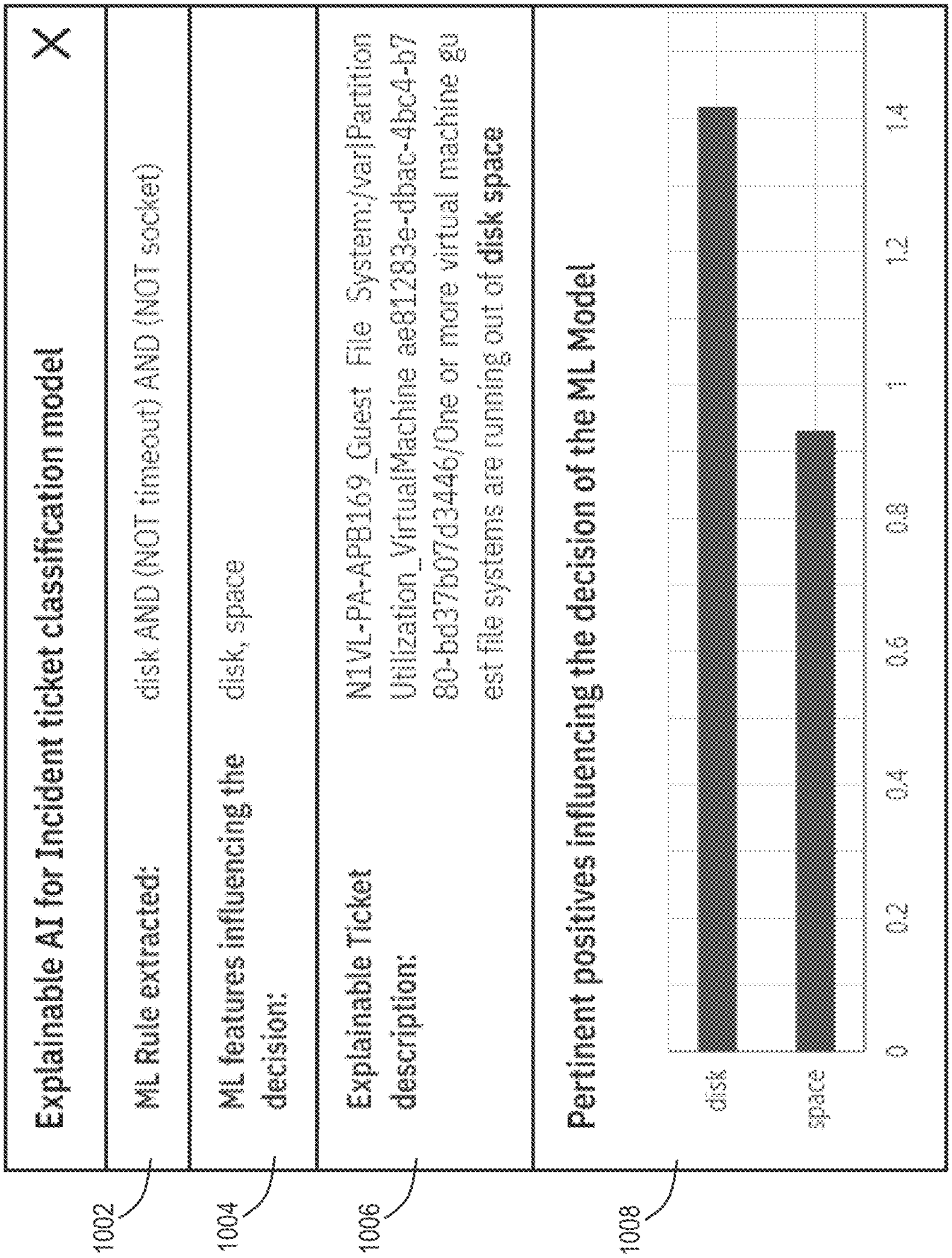
FIG. 10 depicts a block diagram illustrating selecting features (e.g., tokens) from the data of a ticket and presenting the pertinent positive features contributing to the class label for the ticket according to one or more embodiments of the present invention.

At block 906, the software application 204 is configured to display (e.g., on display 119) the selected pertinent positive features with the highest values that are contributing to (i.e., influencing) the decision of the machine learning model 220. For example, the selected pertinent positive features are configured to show the explanations associated with individual predictions (i.e., what was it about the features of this particular ticket that suggested the disk handler automation). In one or more embodiments, for example, the selected pertinent positive features are configured to only show the explanations associated with individual predictions. As displayed (e.g., on display 119) to the user, FIG. 10 shows the machine learning rule at block 1002 that has been extracted in disjunctive normal form and shows the machine learning features influencing the decision at block 1004. FIG. 10 also displays the ticket description of the ticket at block 1006 and display a bar graph showing the pertinent positive features influencing the decision of the machine learning model 220 at block 1008. In the block 1008, the feature disk has a greater influence on the decision than the feature space, although both are used to explain the decision of the machine learning model 220.

Figure 11:
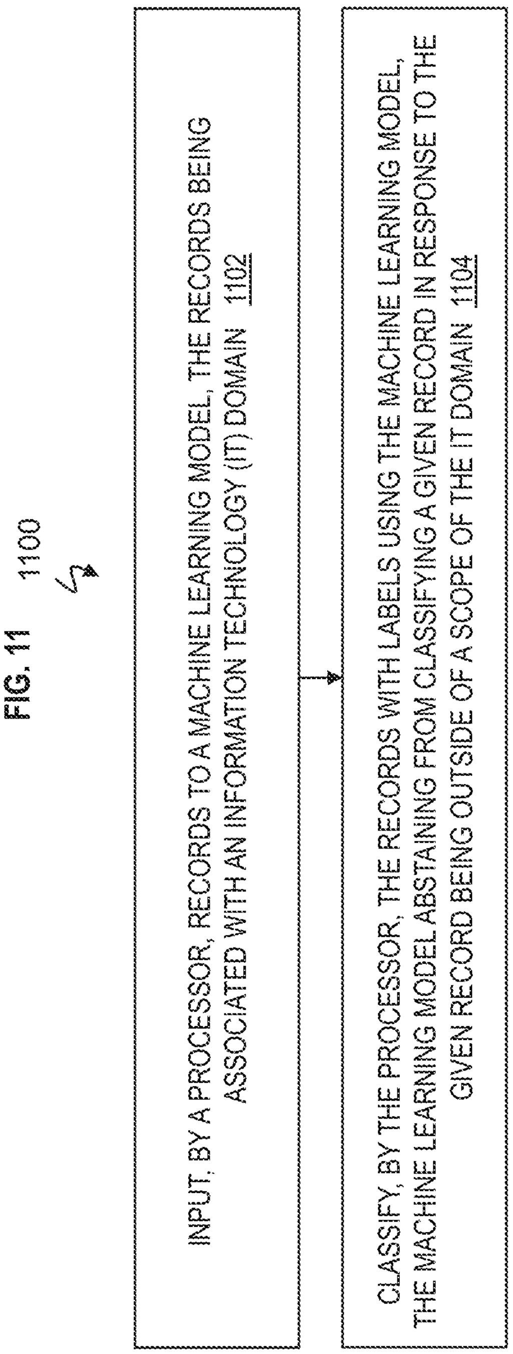
FIG. 11 is a flowchart of a computer-implemented method for providing explainable classifications with abstention using a client agnostic machine learning model according to one or more embodiments of the present invention.

FIG. 11 is a flowchart of a computer-implemented method 1100 for providing explainable classifications with abstention using a client agnostic machine learning model according to one or more embodiments. The computer-implemented method 1100 can be executed by the computer system 202. Reference can be made to any of the figures discussed herein.

At block 1102, the machine learning model 220 receives input of records (e.g., tickets), where the records are associated with an information technology (IT) domain. At block 1102, the machine learning model 220 classifies the records with labels, where the machine learning model abstains from classifying a given record (e.g., another ticket) in response to the given record being outside of a scope of the IT domain.

In one or more embodiments, the machine learning model 220 identifies the given record outside of the IT domain as unclassified. The machine learning model 220 is trained on training data 206 in the IT domain. The machine learning model 220 is trained by receiving input of training data 206 having training records (e.g., tickets) and their corresponding labels to the training records. The machine learning model 220 is trained to abstain from classifying any record outside of the IT domain.

Further, the records and the labels are provided to an automated resolution system 222, the automated resolution system 222 being configured to modify at least one component (e.g., hardware components, software components, and/or both hardware and software components) in an IT environment of an industry. The given record outside of the scope of the IT domain is prevented from being provided to the automated resolution system 222, thereby avoiding any component (e.g., hardware components, software components, and/or both hardware and software components) in the IT environment from being modified based on an incorrect classification of the given record.

The machine learning model 220 includes a linear classifier algorithm, and the records are tickets of technical problems in an IT environment. The linear classifier algorithm is trained on training data in the IT domain, the linear classifier algorithm being further trained on pertinent positive features for the labels without pertinent negative features (as depicted in FIGS. 5A and 5C), the pertinent positive features for the labels having been verified by a human subject matter expert.

Figure 12:
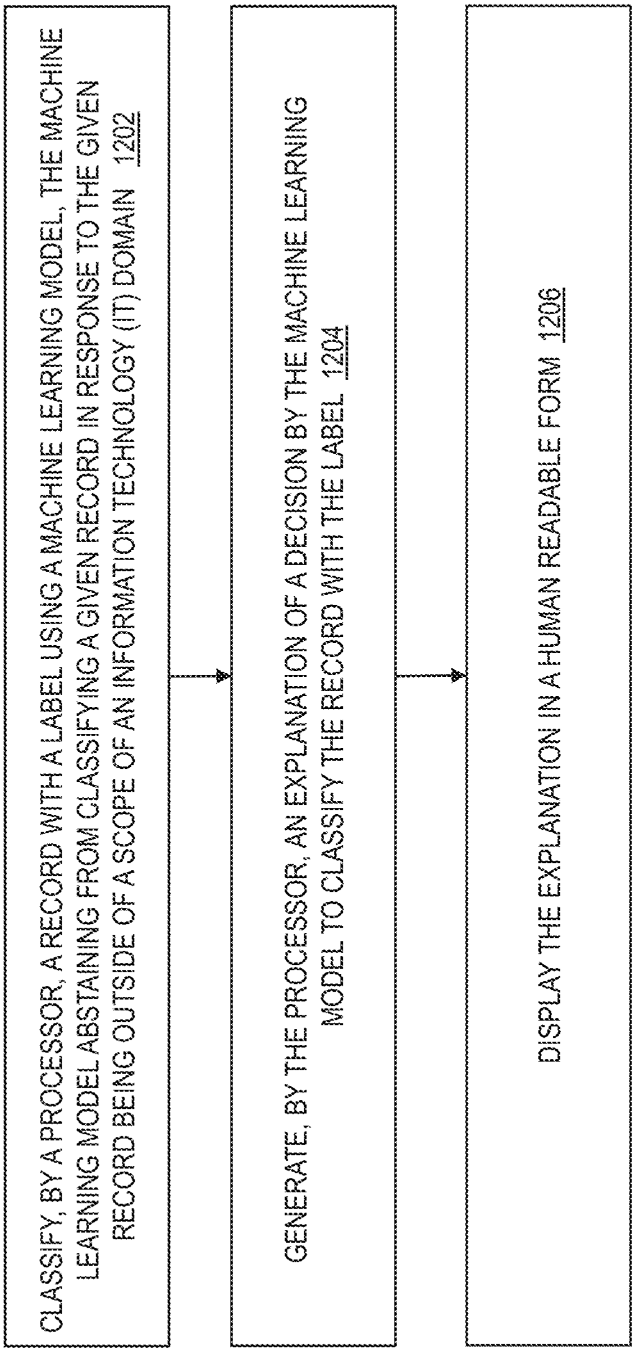
FIG. 12 is a flowchart of a computer-implemented method for providing explainable classifications with abstention using a client agnostic machine learning model according to one or more embodiments of the present invention.

FIG. 12 is a flowchart of a computer-implemented method 1200 for providing explainable classifications with abstention using a client agnostic machine learning model according to one or more embodiments. The computer-implemented method 1200 can be executed by the computer system 202. Reference can be made to any of the figures discussed herein.

At block 1202, the machine learning model 220 classifies an input record (e.g., ticket), where the machine learning model abstains from classifying a given record (e.g., another ticket) in response to the given record being outside of a scope of an information technology (IT) domain. At block 1204, the software application 204 and/or machine learning model 220 generates an explanation of a decision by the machine learning model to classify the record with the label. At block 1206, the software application 204 and/or machine learning model 220 causes the display (e.g., on display 119) the explanation in a human readable form.

In one or more embodiments, the human readable form includes a disjunctive normal form. The explanation of the decision by the machine learning model 220 is based on a linear classifier formula utilized by the machine learning model 220. The explanation of the decision by the machine learning model 220 is based on features and respective coefficients corresponding to the features, the features and the respective coefficients being derived from a linear classifier formula of the machine learning model, as depicted in block 802 in FIG. 8; the features correspond to text from the record (e.g., ticket), as depicted in block 1006 in FIG. 10. Further, the human readable form includes a display (e.g., on display 119) of pertinent positive features with a measure of respective contributions for each of the pertinent positive features to the decision by the machine learning model 220, as depicted in block 1008 in FIG. 10. Further, the machine learning model is trained on training data in the IT domain. The machine learning model includes a linear classifier algorithm, and the record is a ticket of technical problems in an IT environment.

In one or more embodiments, the machine learning model 220, rule generation algorithm 224, and/or NLP model 228 can include various engines/classifiers and/or can be implemented on a neural network. The features of the engines/classifiers can be implemented by configuring and arranging the computer system 202 to execute machine learning algorithms. In general, machine learning algorithms, in effect, extract features from received data (e.g., a ticket of a technical computer problem) in order to "classify" the received data. Examples of suitable classifiers include but are not limited to neural networks, support vector machines (SVMs), logistic regression, decision trees, hidden Markov Models (HMMs), etc. The end result of the classifier's operations, i.e., the "classification," is to predict a class (or label) for the data. The machine learning algorithms apply machine learning techniques to the received data in order to, over time, create/train/update a unique "model." The learning or training performed by the engines/classifiers can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

In one or more embodiments, the engines/classifiers are implemented as neural networks (or artificial neural networks), which use a connection between a pre-neuron and a post-neuron, thus representing the connection weight. The connection represents, for example, a synapse between a pre-neuron and a post-neuron. Neuromorphic systems are interconnected elements that act as simulated "neurons" and exchange "messages" between each other. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. After being weighted and transformed by a function (i.e., transfer function) determined by the network's designer, the activations of these input neurons are then passed to other downstream neurons, which are often referred to as "hidden" neurons. This process is repeated until an output neuron is activated. Thus, the activated output neuron determines (or "learns") and provides an output or inference regarding the input.

Training datasets (e.g., training data 206) can be utilized to train the machine learning algorithms. The training datasets can include historical data of past tickets and the corresponding options/suggestions/resolutions provided for the respective tickets. Labels of options/suggestions can be applied to respective tickets to train the machine learning algorithms, as part of supervised learning. For the preprocessing, the raw training datasets may be collected and sorted manually. The sorted dataset may be labeled (e.g., using the Amazon Web Services® (AWS®) labeling tool such as Amazon SageMaker® Ground Truth). The training dataset may be divided into training, testing, and validation datasets. Training and validation datasets are used for training and evaluation, while the testing dataset is used after training to test the machine learning model on an unseen dataset. The training dataset may be processed through different data augmentation techniques. Training takes the labeled datasets, base networks, loss functions, and hyperparameters, and once these are all created and compiled, the training of the neural network occurs to eventually result in the trained machine learning model (e.g., trained machine learning algorithms). Once the model is trained, the model (including the adjusted weights) is saved to a file for deployment and/or further testing on the test dataset.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
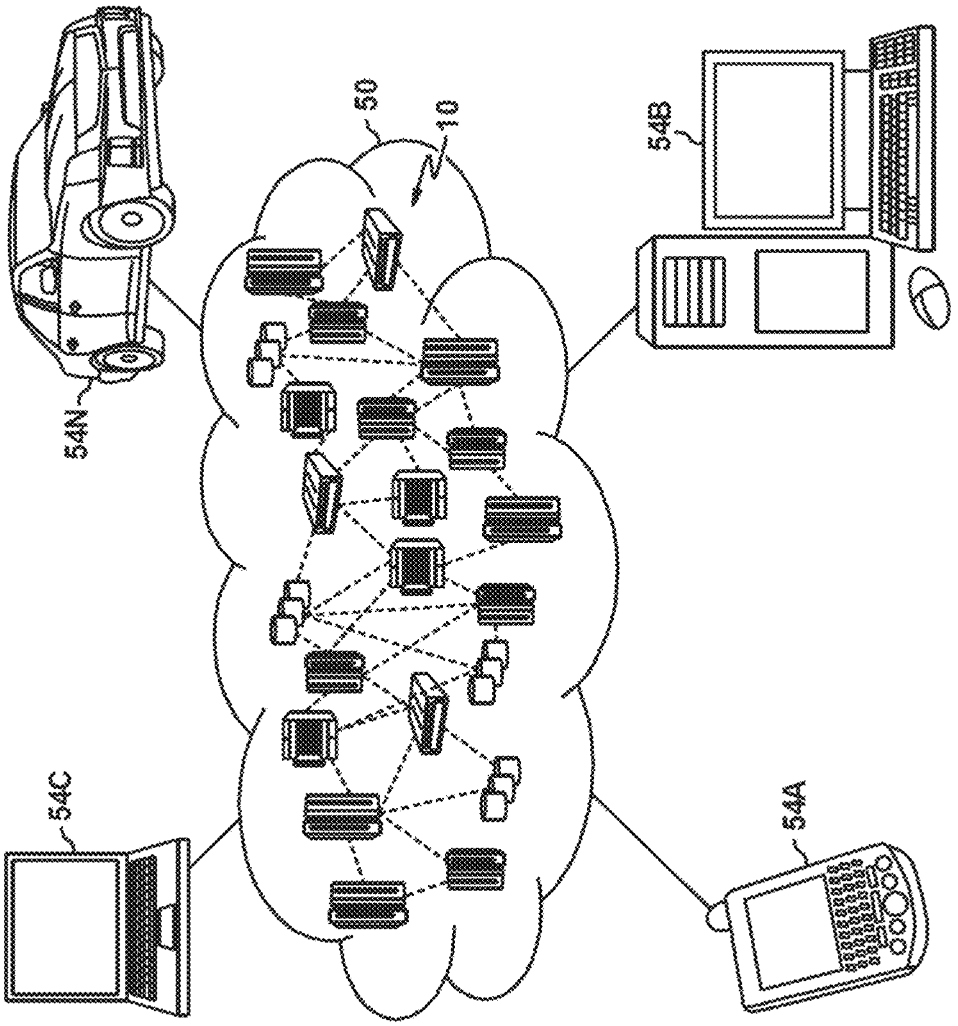
FIG. 13 depicts a cloud computing environment according to one or more embodiments of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
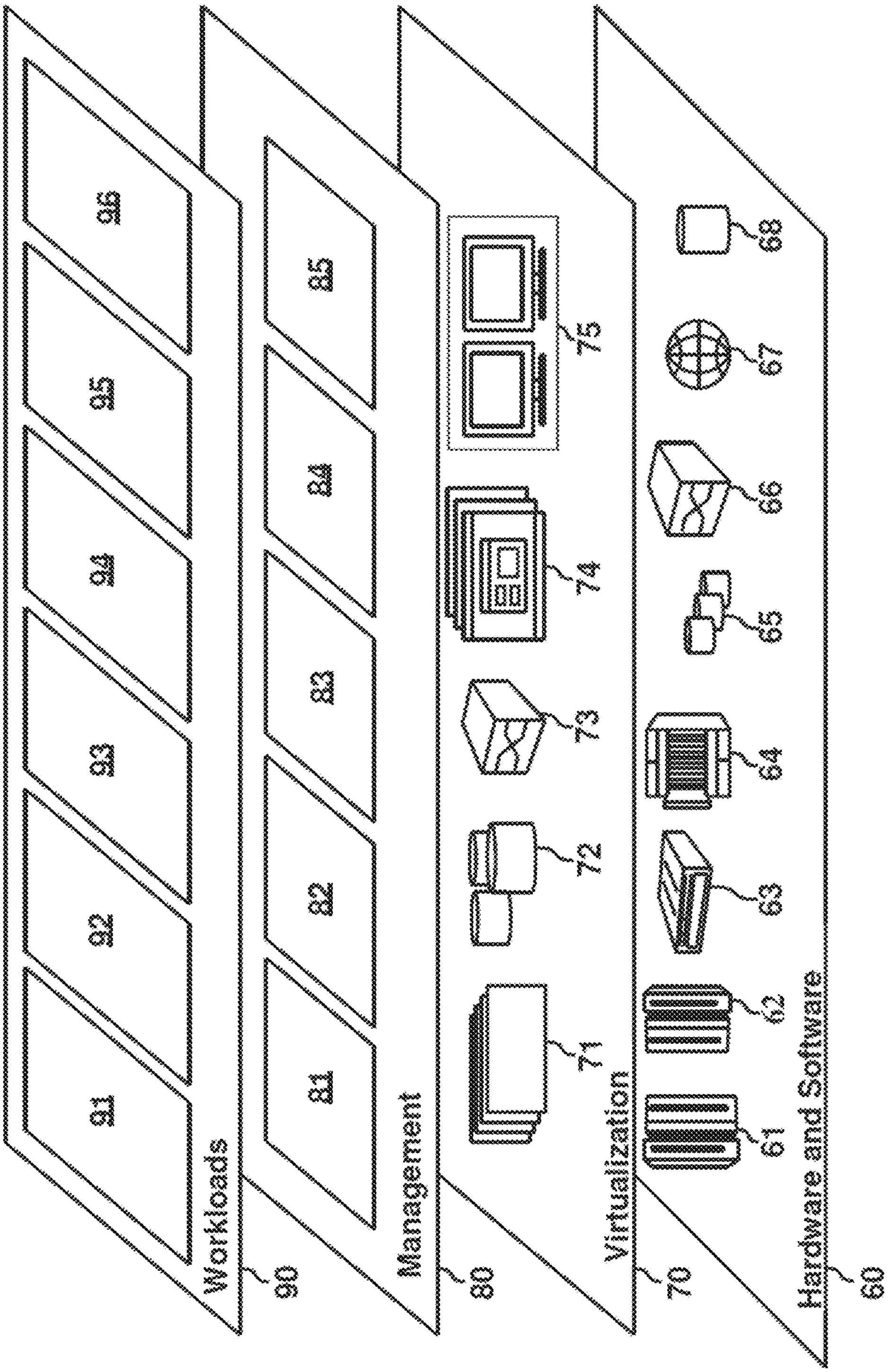
FIG. 14 depicts abstraction model layers according to one or more embodiments of the present invention.

Referring now to FIG. 14, a set of functional abstraction layers provided by cloud computing environment 50 (depicted in FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:

inputting, by a processor, records to a machine learning model, the records being associated with an information technology (IT) domain;

classifying, by the processor, the records with labels using the machine learning model, the machine learning model abstaining from classifying a given record in response to the given record being outside of a scope of the IT domain, the IT domain comprising hardware and software associated with an organization;

wherein the machine learning model is trained on training data in the IT domain, the training data comprising tickets that have been resolved by an automated resolution system in which the automated resolution system executed a playbook to resolve the tickets; and blocking the given record from being transferred to the automated resolution system that is configured to modify at least one component in an IT environment, based on the machine learning model abstaining from classifying the given record.

2. The computer-implemented method of claim 1, wherein the machine learning model identifies the given record outside of the IT domain as unclassified.

3. The computer-implemented method of claim 1, wherein the tickets used as training data comprise issues related to two or more of application down, database inactive, disk handler, database space, file system mount handler, high disk space usage handler, high memory usage, host down handler, job abends, process CPU spike handler, or service handler.

4. The computer-implemented method of claim 1, wherein:

the machine learning model is trained by receiving input of training data comprising training records and corresponding training labels to the training records; and the machine learning model is trained to abstain from classifying any record outside of the IT domain.

5. The computer-implemented method of claim 1, wherein the records and the labels are transferred to the automated resolution system.

6. The computer-implemented method of claim 1, wherein blocking the given record from being transferred to the automated resolution system prevents any component in the IT environment from being modified based on an incorrect classification of the given record.

7. The computer-implemented method of claim 1, wherein:

the machine learning model comprises a linear classifier algorithm; and the records are the tickets of technical problems in the IT environment.

8. A computer-implemented method comprising:

inputting, by a processor, records to a linear classifier algorithm, the records being associated with an information technology (IT) domain;

classifying, by the processor, the records with labels using the linear classifier algorithm, the linear classifier algorithm abstaining from classifying a given record in response to the given record being outside of a scope of the IT domain, the IT domain comprising hardware and software associated with an organization;

wherein the linear classifier algorithm is trained on training data in the IT domain, the training data comprising tickets that have been resolved by an automated resolution system in which the automated resolution system executed a playbook to resolve the tickets;

wherein the tickets used as training data comprise issues related to two or more of application down, database inactive, disk handler, database space, file system mount handler, high disk space usage handler, high memory usage, host down handler, job abends, process CPU spike handler, or service handler; and blocking the given record from being transferred to the automated resolution system that is configured to modify at least one component in an IT environment, based on the linear classifier algorithm abstaining from classifying the given record;

wherein the given record is transferred to a separate route for resolution than the records classified with the labels, based on the linear classifier algorithm abstaining from classifying the given record.

9. The computer-implemented method of claim 8, wherein the linear classifier algorithm identifies the given record outside of the IT domain as unclassified.

10. The computer-implemented method of claim 8, wherein the linear classifier algorithm is trained on training data in the IT domain, the linear classifier algorithm being further trained on pertinent positive features for the labels without pertinent negative features, the pertinent positive features for the labels having been verified.

11. A system comprising:

a memory having computer readable instructions; and one or more processors for executing the computer readable instructions, the computer readable instructions controlling the one or more processors to perform operations comprising:

inputting records to a machine learning model, the records being associated with an information technology (IT) domain;

classifying the records with labels using the machine learning model, the machine learning model abstaining from classifying a given record in response to the given record being outside of a scope of the IT domain, the IT domain comprising hardware and software associated with an organization;

wherein the machine learning model is trained on training data in the IT domain, the training data comprising tickets that have been resolved by an automated resolution system in which the automated resolution system executed a playbook to resolve the tickets; and blocking the given record from being transferred to the automated resolution system that is configured to modify at least one component in an IT environment, based on the machine learning model abstaining from classifying the given record.

12. The system of claim 11, wherein the machine learning model identifies the given record outside of the IT domain as unclassified.

13. The system of claim 11, wherein the tickets used as training data comprise issues related to two or more of application down, database inactive, disk handler, database space, file system mount handler, high disk space usage handler, high memory usage, host down handler, job abends, process CPU spike handler, or service handler.

14. The system of claim 11, wherein:

the machine learning model is trained by receiving input of training data comprising training records and corresponding training labels to the training records; and the machine learning model is trained to abstain from classifying any record outside of the IT domain.

15. The system of claim 11, wherein the records and the labels are transferred to the automated resolution system.

16. The system of claim 11, wherein blocking the given record from being transferred to the automated resolution system prevents any component in the IT environment from being modified based on an incorrect classification of the given record.

17. The system of claim 11, wherein:
the machine learning model comprises a linear classifier algorithm; and
the records are the tickets of technical problems in the IT environment.

18. A system comprising:
a memory having computer readable instructions; and
one or more processors for executing the computer readable instructions, the computer readable instructions controlling the one or more processors to perform operations comprising:
inputting, by the one or more processors, records to a linear classifier algorithm, the records being associated with an information technology (IT) domain;
classifying, by the one or more processors, the records with labels using the linear classifier algorithm, the linear classifier algorithm abstaining from classifying a given record in response to the given record being outside of a scope of the IT domain, the IT domain comprising hardware and software associated with an organization;
wherein the linear classifier algorithm is trained on training data in the IT domain, the training data comprising tickets that have been resolved by an automated resolution system in which the automated resolution system executed a playbook to resolve the tickets;
wherein the tickets used as training data comprise issues related to two or more of application down, database inactive, disk handler, database space, file system mount handler, high disk space usage handler, high memory usage, host down handler, job abends, process CPU spike handler, or service handler; and
blocking the given record from being transferred to the automated resolution system that is configured to modify at least one component in an IT environment, based on the linear classifier algorithm abstaining from classifying the given record;
wherein the given record is transferred to a separate route for resolution than the records classified with the labels, based on the linear classifier algorithm abstaining from classifying the given record.

19. A computer program product comprising a computer readable storage medium having program instructions embodied therewith, the program instructions executable by one or more processors to cause the one or more processors to perform operations comprising:
inputting records to a machine learning model, the records being associated with an information technology (IT) domain;
classifying the records with labels using the machine learning model, the machine learning model abstaining from classifying a given record in response to the given record being outside of a scope of the IT domain, the IT domain comprising hardware and software associated with an organization;
wherein the machine learning model is trained on training data in the IT domain, the training data comprising tickets that have been resolved by an automated resolution system in which the automated resolution system executed a playbook to resolve the tickets; and
blocking the given record from being transferred to the automated resolution system that is configured to modify at least one component in an IT environment, based on the machine learning model abstaining from classifying the given record.

20. The computer program product of claim 19, wherein the machine learning model identifies the given record outside of the IT domain as unclassified.

21. The computer program product of claim 19, wherein the tickets used as training data comprise issues related to two or more of application down, database inactive, disk handler, database space, file system mount handler, high disk space usage handler, high memory usage, host down handler, job abends, process CPU spike handler, or service handler.

22. The computer program product of claim 19, wherein:
the machine learning model is trained by receiving input of training data comprising training records and corresponding training labels to the training records; and
the machine learning model is trained to abstain from classifying any record outside of the IT domain.

23. The computer program product of claim 19, wherein the records and the labels are transferred to the automated resolution system.

24. The computer program product of claim 19, wherein blocking the given record from being transferred to the automated resolution system prevents any component in the IT environment from being modified based on an incorrect classification of the given record.

25. The computer program product of claim 19, wherein:
the machine learning model comprises a linear classifier algorithm; and
the records are the tickets of technical problems in the IT environment.

* * * * *